US012659279B2

(12) United States Patent
Zhang et al.

(10) Patent No.: US 12,659,279 B2
(45) Date of Patent: Jun. 16, 2026

(54) INTERNET TRAFFIC DETECTING AND PRIORITIZING

(71) Applicant: QUALCOMM Incorporated, San Diego, CA (US)

(72) Inventors: Juan Zhang, San Diego, CA (US); Ajith Tom Payyappilly, San Diego, CA (US); Vinay Paradkar, Broomfield, CO (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/770,079

(22) Filed: Jul. 11, 2024

(65) Prior Publication Data

US 2026/0019370 A1     Jan. 15, 2026

(51) Int. Cl.
*H04L 47/24* (2022.01)
*H04L 47/50* (2022.01)

(52) U.S. Cl.
CPC .............. *H04L 47/24* (2013.01); *H04L 47/50* (2013.01)

(58) Field of Classification Search
CPC ................................. H04L 47/24; H04L 47/50
See application file for complete search history.

(56) References Cited

U.S. PATENT DOCUMENTS

| | | | | |
|---|---|---|---|---|
| 2018/0077068 | A1* | 3/2018 | Dhanabalan | ............ H04L 69/04 |
| 2019/0297019 | A1* | 9/2019 | Mudireddy | ....... H04W 28/0273 |
| 2022/0210083 | A1* | 6/2022 | Chen | ........................ H04L 67/61 |
| 2022/0303243 | A1* | 9/2022 | Sevindik | ............ H04L 63/0485 |

FOREIGN PATENT DOCUMENTS

| | | |
|---|---|---|
| EP | 2838230 A2 | 2/2015 |
| EP | 2975812 A1 | 1/2016 |

OTHER PUBLICATIONS

International Search Report and Written Opinion PCT/US2025/036058 ISA/EPO Nov. 4, 2025.

* cited by examiner

*Primary Examiner* — Farzana B Huq
(74) *Attorney, Agent, or Firm* — Harrity & Harrity, LLP

(57) ABSTRACT

Various aspects of the present disclosure generally relate to wireless communication. In some aspects, a user equipment (UE) may identify, by a first entity of the UE, a first traffic flow of the UE. The UE may provide, from the first entity and to a second entity of the UE, an indication that the first traffic flow is associated with a first priority. The UE may obtain, from the second entity, a first data packet associated with the first traffic flow, wherein the first data packet is queued in a first queue. The UE may obtain, from the second entity, a second data packet associated with a second traffic flow that is associated with a second priority, the first priority being higher than the second priority. The UE may transmit the first data packet prior to transmitting the second data packet. Numerous other aspects are described.

20 Claims, 11 Drawing Sheets

800

1000

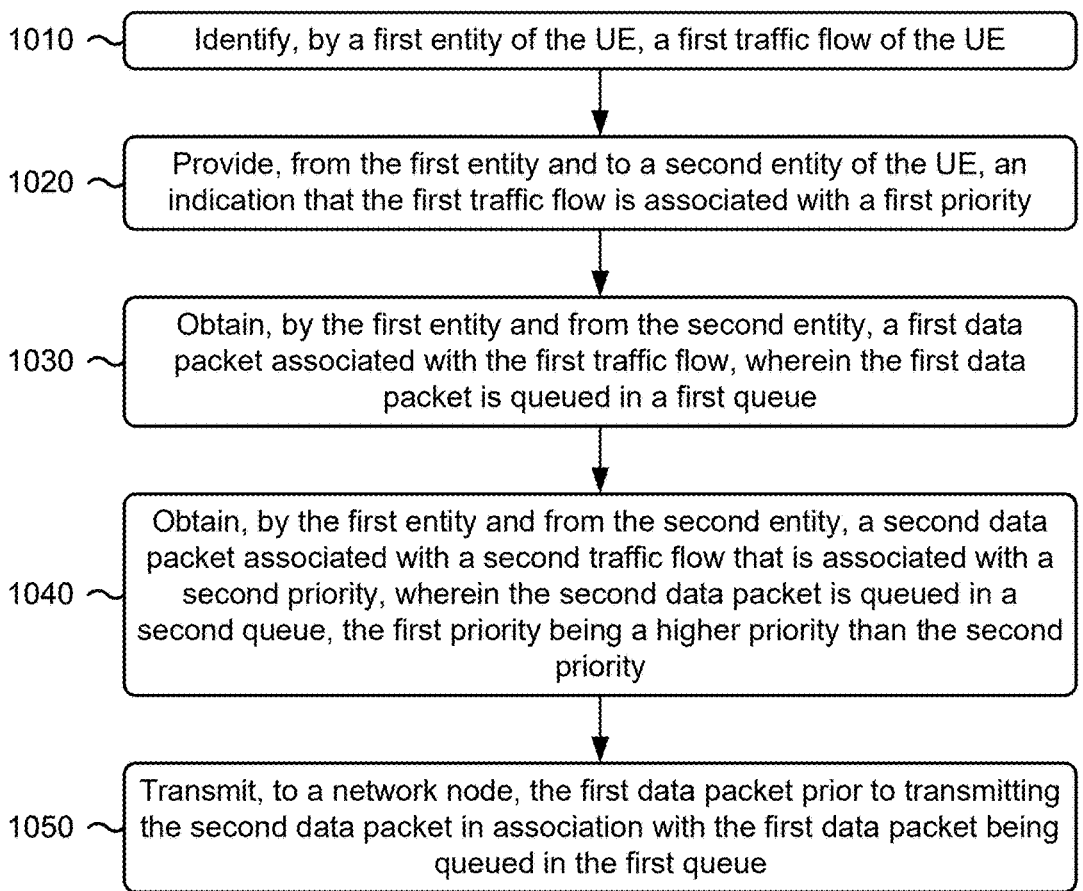

1010 — Identify, by a first entity of the UE, a first traffic flow of the UE

1020 — Provide, from the first entity and to a second entity of the UE, an indication that the first traffic flow is associated with a first priority 1030 — Obtain, by the first entity and from the second entity, a first data packet associated with the first traffic flow, wherein the first data packet is queued in a first queue 1040 — Obtain, by the first entity and from the second entity, a second data packet associated with a second traffic flow that is associated with a second priority, wherein the second data packet is queued in a second queue, the first priority being a higher priority than the second priority 1050 — Transmit, to a network node, the first data packet prior to transmitting the second data packet in association with the first data packet being queued in the first queue

FIG. 10

INTERNET TRAFFIC DETECTING AND PRIORITIZING

FIELD OF THE DISCLOSURE

Aspects of the present disclosure generally relate to wireless communication and specifically relate to techniques, apparatuses, and methods for internet traffic detecting and prioritizing.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to an apparatus for wireless communication at a user equipment (UE). The apparatus may include one or more memories and one or more processors coupled to the one or more memories. The one or more processors may be configured to identify, by a first entity of the UE, a first traffic flow of the UE. The one or more processors may be configured to provide, from the first entity and to a second entity of the UE, an indication that the first traffic flow is associated with a first priority. The one or more processors may be configured to obtain, from the second entity, a first data packet associated with the first traffic flow, wherein the first data packet is queued in a first queue. The one or more processors may be configured to obtain, from the second entity, a second data packet associated with a second traffic flow that is associated with a second priority, wherein the second data packet is queued in a second queue, the first priority being a higher priority than the second priority. The one or more processors may be configured to transmit, to a network node, the first data packet prior to transmitting the second data packet in association with the first data packet being queued in the first queue.

Some aspects described herein relate to a method of wireless communication performed by a UE. The method may include identifying, by a first entity of the UE, a first traffic flow of the UE. The method may include providing, from the first entity and to a second entity of the UE, an indication that the first traffic flow is associated with a first priority. The method may include obtaining, by the first entity and from the second entity, a first data packet associated with the first traffic flow, wherein the first data packet is queued in a first queue. The method may include obtaining, by the first entity and from the second entity, a second data packet associated with a second traffic flow that is associated with a second priority, wherein the second data packet is queued in a second queue, the first priority being a higher priority than the second priority. The method may include transmitting, to a network node, the first data packet prior to transmitting the second data packet in association with the first data packet being queued in the first queue.

Some aspects described herein relate to a non-transitory computer-readable medium that stores a set of instructions for wireless communication by a UE. The set of instructions, when executed by one or more processors of the UE, may cause the UE to identify, by a first entity of the UE, a first traffic flow of the UE. The set of instructions, when executed by one or more processors of the UE, may cause the UE to provide, from the first entity and to a second entity of the UE, an indication that the first traffic flow is associated with a first priority. The set of instructions, when executed by one or more processors of the UE, may cause the UE to obtain, from the second entity, a first data packet associated with the first traffic flow, wherein the first data packet is queued in a first queue. The set of instructions, when executed by one or more processors of the UE, may cause the UE to obtain, from the second entity, a second data packet associated with a second traffic flow that is associated with a second priority, wherein the second data packet is queued in a second queue, the first priority being a higher priority than the second priority. The set of instructions, when executed by one or more processors of the UE, may cause the UE to transmit, to a network node, the first data packet prior to transmitting the second data packet in association with the first data packet being queued in the first queue.

Some aspects described herein relate to an apparatus for wireless communication. The apparatus may include means for identifying a first traffic flow of the apparatus. The apparatus may include means for providing, from the first entity and to a second entity of the apparatus, an indication that the first traffic flow is associated with a first priority. The apparatus may include means for obtaining, from the second entity, a first data packet associated with the first traffic flow, wherein the first data packet is queued in a first queue. The apparatus may include means for obtaining, from the second entity, a second data packet associated with a second traffic flow that is associated with a second priority, wherein the second data packet is queued in a second queue, the first priority being a higher priority than the second priority. The apparatus may include means for transmitting, to a network node, the first data packet prior to transmitting the second data packet in association with the first data packet being queued in the first queue.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 10 is a diagram illustrating an example process performed, for example, at a UE or an apparatus of a UE, in accordance with the present disclosure.

DETAILED DESCRIPTION

Figure 1:
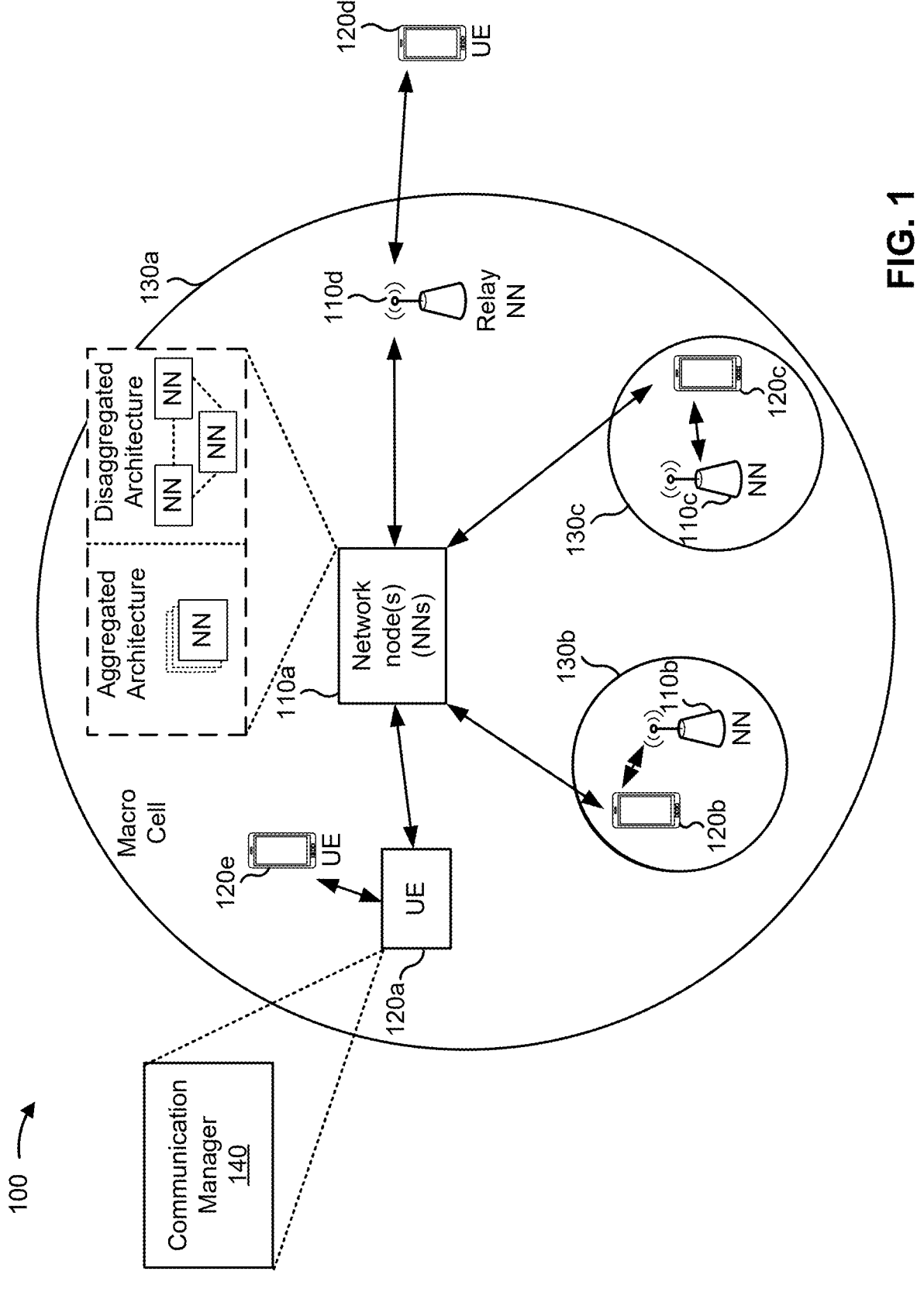
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Some wireless communication systems (e.g., such as fifth generation (5G) communication systems, sixth generation (6G) communication systems, among other examples) may support devices that are enabled for communicating various types of data traffic. (e.g., "traffic" as used herein may refer to data or information for communication). For example, some wireless communications systems may support a user equipment (UE) that is enabled to communicate internet traffic (e.g., data traffic that is communicated via a series of data packets, which may be referred to as packet data network (PDN) traffic) including real-time traffic and non-real-time traffic. Real-time traffic may include gaming traffic, extended reality traffic, voice traffic (e.g., voice over internet protocol (VOIP) traffic), and/or video traffic (e.g., video chat and/or conferencing traffic such as traffic from internet-based video meeting services), among other examples. Non-real-time traffic may include examples such as internet browser traffic, uploading files, downloading files, and video streaming traffic (e.g., video streaming traffic, such as traffic from internet-based streaming platforms), among other examples.

Some UEs may not differentiate between real-time traffic and non-real time traffic. For example, a UE may queue all PDN traffic (e.g., including non-real-time traffic and real-time traffic) for transmission and/or for reception processing on a "first in, first out" basis such that real-time traffic may be queued behind non-real-time traffic. Therefore, in some scenarios, the UE may communicate non-real-time traffic before communicating real-time traffic, which may unintentionally prioritize non-real-time traffic while delaying real-time traffic. Real-time traffic may be more sensitive to delays in communication than non-real time traffic. Therefore, a delay in the communication of a real-time data packet may negatively impact a user experience by causing a lag or delay.

In some examples, a UE may be configured with multiple radio bearers and/or core network bearers (e.g., logical channels for data communication) in which a particular radio bearer may be prioritized such that some traffic could be prioritized by being routed to the particular radio bearer and transmitted via the radio bearer without being queued behind lower priority traffic. For example, lower priority traffic may be routed through a first radio bearer and may not impede transmission of the higher priority traffic (e.g., which may be routed through a second radio bearer having a higher priority than the first radio bearer). However, in such examples, each application of the UE may route correspond-ing traffic through particular radio bearers by using an interface (e.g., application programming interface (API) and/or an auxiliary API) to appropriately identify higher-priority traffic and to route the traffic by priority. In such examples, a vendor of each application may implement an auxiliary interface within an application configuration to effectively prioritize traffic via multiple radio bearers and/or core network bearers. Such implementations may require a high percentage of participation by application vendors to effectively prioritize traffic communication across applica-tions. As a result, prioritization of real-time traffic may be inconsistent or non-existent, or may be implemented on an application-by-application basis, which may negatively impact latency, reliability, and/or user experience.

Various aspects relate generally to the detection and prioritization of real-time traffic. In some aspects, the real-time traffic may include internet traffic and/or PDN traffic. Some aspects more specifically relate to a first entity of a UE, such as a modem or processing system, identifying that an application of the UE is communicating a traffic flow ("traffic flow" as used herein refers to one or more process-ing operations associated with preparing, queueing, packeting providing, obtaining, transmitting, and/or receiving (e.g., among other examples) control and/or user data or information for communication by any entity of a device (e.g., the UE)). In some aspects, the traffic flow may include real-time traffic. The UE may indicate to a second entity of the UE, such as a high-level operating system (HLOS) and/or an applications processor (AP) (HLOS/AP), that traffic associated with the application and/or the traffic flow is associated with a higher priority than other traffic flows (e.g., because the traffic flow includes real-time traffic and/or another higher priority traffic type). The second entity of the UE may output, and the first entity may obtain, a first data packet associated with the traffic flow, which may be queued into a first queue. The second entity of the UE may output, and the first entity may obtain, a second data packet associated with a different traffic flow (e.g., a traffic flow having a different type of traffic associated with a same or different application of the UE), which may be queued into the first queue or into a second queue. The UE may transmit, and a network node may receive, the first data packet prior to the second data packet according to the first packet being queued in the first queue. For example, the UE may transmit the first data packet prior to transmitting the second data packet according to the first packet being queued in the first queue.

In some aspects, the UE may identify, from a list of applications indicated by a configuration, a set of one or more applications stored by the UE. In some aspects, each application of the set of one or more applications may be configured with a traffic type, the traffic type being associ-ated with the first priority. The UE may provide, to the second entity according to the configuration, a report request that requests traffic flow information, from the second entity, for each application of the set of one or more applications. In such aspects, the first entity of the UE may obtain, and the second entity of the UE may provide, traffic flow informa-tion, which the first entity of the UE may use to identify that the application of the UE is communicating the traffic flow including the real-time traffic. For example, the traffic flow information may include information indicative of charac-teristics of traffic associated with one or more applications (e.g., from the set of one or more applications) that are currently executing on the UE. For example, characteristics of traffic may include a traffic type (e.g., "normal," "low-latency," "video," "video chat," "gaming," "streaming," "real-time," and/or "non-real-time," among other examples), a quantity of bytes in the traffic (e.g., uplink and/or downlink bytes for transmission and/or reception), a user-plane application (e.g., executed by the UE) associated with the traffic and/or the traffic flow of the traffic, and/or whether the traffic flow and/or traffic is running in back-ground operations of the UE and/or foreground operations of the UE, among other examples.

In some aspects, the first entity of the UE may obtain a first indication of one or more traffic flows and one or more corresponding traffic types of the one or more traffic flows from a machine learning (ML) module of the UE (e.g., where the indication of one or more traffic flows is an output of an artificial intelligence (AI) and/or ML (AI/ML) model deployed via the ML module). In such examples, the first entity of the UE may use the indication of the one or more traffic flows and the corresponding one or more traffic types to identify that the application of the UE is communicating the traffic flow including the real-time traffic. In such aspects, providing the indication that the first traffic flow is associated with the first priority includes providing, to the second entity of the UE, an indication that the one or more traffic flows are associated with the first priority and the one or more traffic flows that include the traffic flow.

Particular aspects of the subject matter described in this disclosure can be implemented to realize one or more of the following potential advantages. In some aspects, by identi-fying the first traffic flow, the described techniques can be used to differentiate between traffic flows including real-time traffic and traffic flows including non-real-time traffic, which may enable the UE to perform one or more actions to prioritize real-time traffic, which may enhance user experi-ence. By providing, from the first entity and to the second entity of the UE, an indication that the first traffic flow is associated with a first priority (e.g., is associated with real-time traffic), the described techniques can be used to queue high priority data packets in a manner that appropri-ately prioritizes traffic that is sensitive to delay, and depri-oritizes non-real-time traffic by a processing system (e.g., a modem) of the UE. Use of the processing system (e.g., the modem) to prioritize traffic may eliminate the need for application-driven (e.g., third party) prioritization of data packets (e.g., such as via APIs associated with or imple-mented by a vendor of an application), thereby increasing a likelihood or frequency that real-time data will be prioritized. By transmitting, to a network node, the first data packet prior to transmitting the second data packet in association with the first data packet being queued in the first queue, the described techniques can be used to transmit high priority data packets in a manner that appropriately prioritizes traffic that is sensitive to delay and deprioritizes other traffic, thereby more efficiently utilizing time and/or frequency resources and decreasing latency of real-time traffic. This may improve user experience associated with real-time traffic.

By obtaining traffic flow information (e.g., which the first entity of the UE may use to identify that the application of the UE is communicating the traffic flow including the real-time traffic), the described techniques can be used to assign a higher priority to select traffic flows indicated in the traffic flow information. For example, the first entity of the UE may assign and/or provide different priorities for the traffic flows, to enable traffic from multiple applications to be prioritized via separate high-priority queues (e.g., each corresponding to a separate radio bearer). Therefore, the traffic flows may be transmitted during overlapping time resources via multiple radio bearers. This may decrease latency for multiple traffic flows associated with multiple applications and/or increase throughput, among other examples. By obtaining the indication of the one or more traffic flows from the ML module of the UE, the described techniques may be used to conserve processing power of the first entity (e.g., of the modem) of the UE by using the AI/ML model (e.g., an ML algorithm) to more efficiently identify which traffic flows to prioritize.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (cMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or AI/ML, among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120c.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHz), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced cMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or cMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120c) may communicate directly with one another using sidelink communications (for example, without communicating by way of a network node 110 as an intermediary). As an example, the UE 120a may directly transmit data, control information, or other signaling as a sidelink communication to the UE 120c. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may identify, by a first entity of the UE, a first traffic flow of the UE; provide, from the first entity and to a second entity of the UE, an indication that the first traffic flow is associated with a first priority; obtain, from the second entity, a first data packet associated with the first traffic flow, wherein the first data packet is queued in a first queue; obtain, from the second entity, a second data packet associated with a second traffic flow that is associated with a second priority, wherein the second data packet is queued in a second queue, the first priority being a higher priority than the second priority; and transmit, to a network node, the first data packet prior to transmitting the second data packet in association with the first data packet being queued in the first queue. Additionally, or alternatively, the communication manager 140 may perform one or more other operations described herein.

As indicated above, FIG. 1 is provided as an example. Other examples may differ from what is described with regard to FIG. 1.

Figure 2:
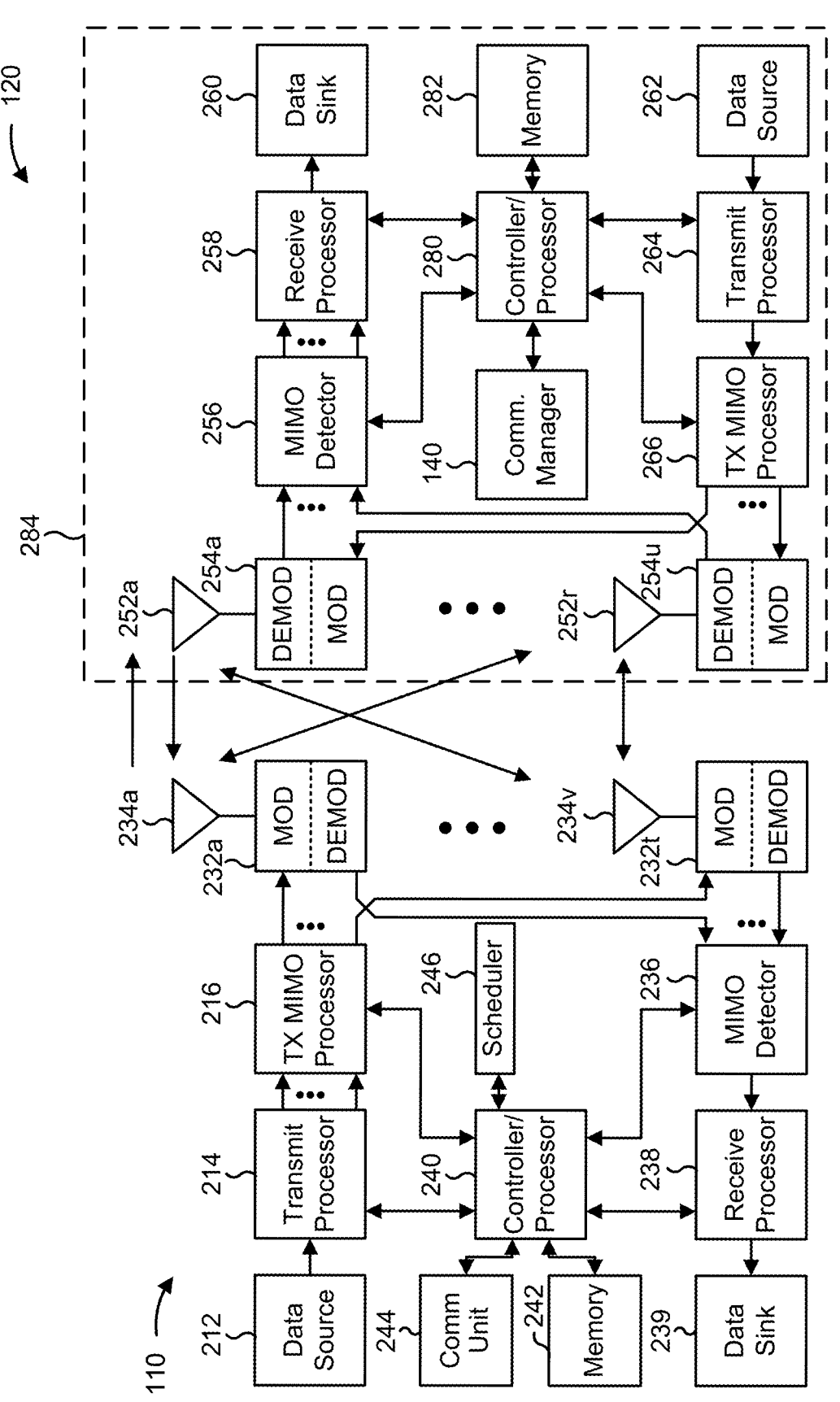
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem

254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
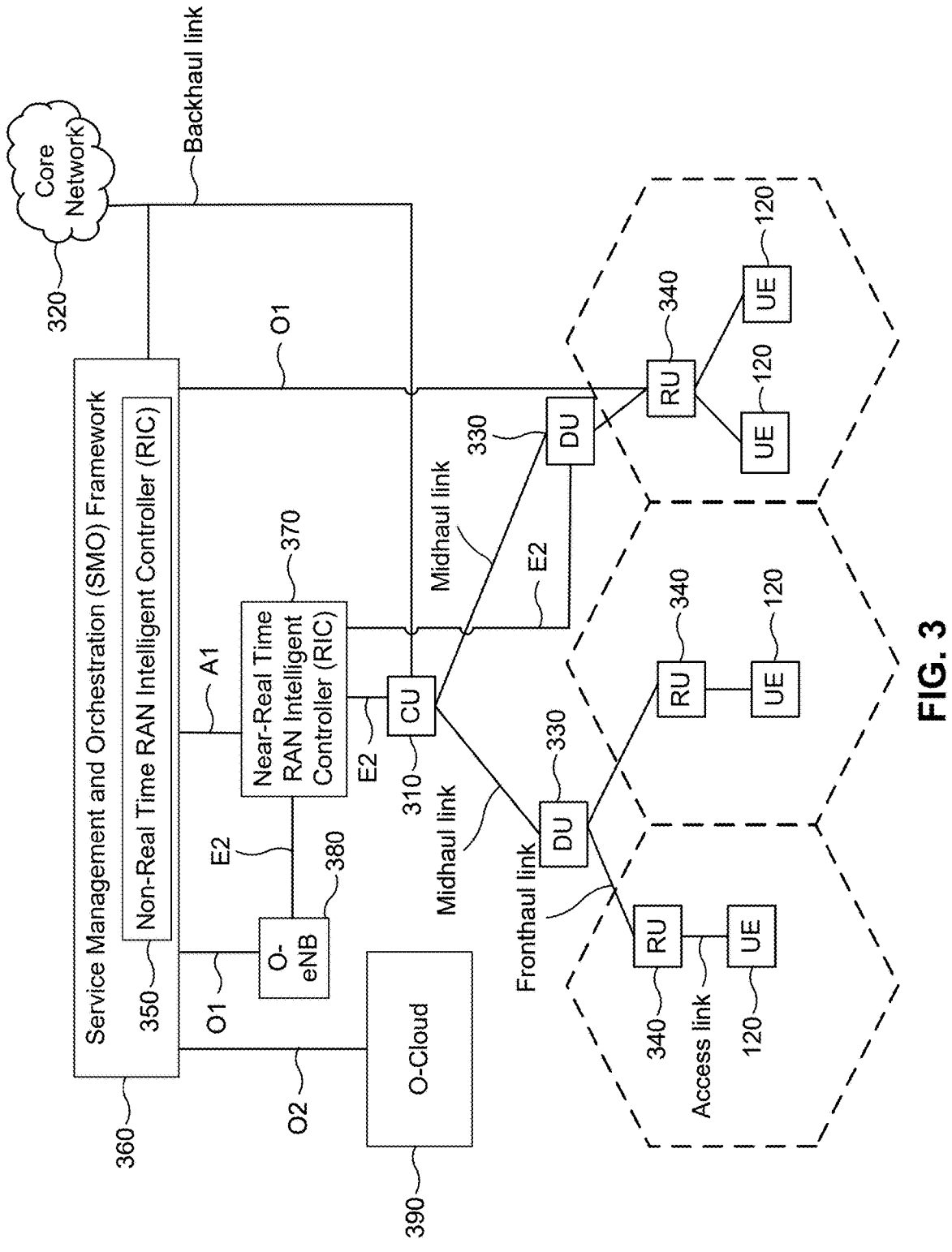
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with internet traffic detection and prioritization, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, or other processes as described herein. In some examples, executing instructions may include running the instructions, converting the instructions, compiling the instructions, and/or interpreting the instructions, among other examples.

In some aspects, the UE 120 includes means for identifying, by a first entity of the UE, a first traffic flow of the UE; means for providing, from the first entity and to a second entity of the UE, an indication that the first traffic flow is associated with a first priority; means for obtaining, by the first entity and from the second entity, a first data packet associated with the first traffic flow, wherein the first data packet is queued in a first queue; means for obtaining, by the first entity and from the second entity, a second data packet associated with a second traffic flow that is associated with a second priority, wherein the second data packet is queued in a second queue, the first priority being a higher priority than the second priority; and/or means for transmitting, to a network node, the first data packet prior to transmitting the second data packet in association with the first data packet being queued in the first queue. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 3 is provided as an example. Other examples may differ from what is described with regard to FIG. 3.

Figure 4:
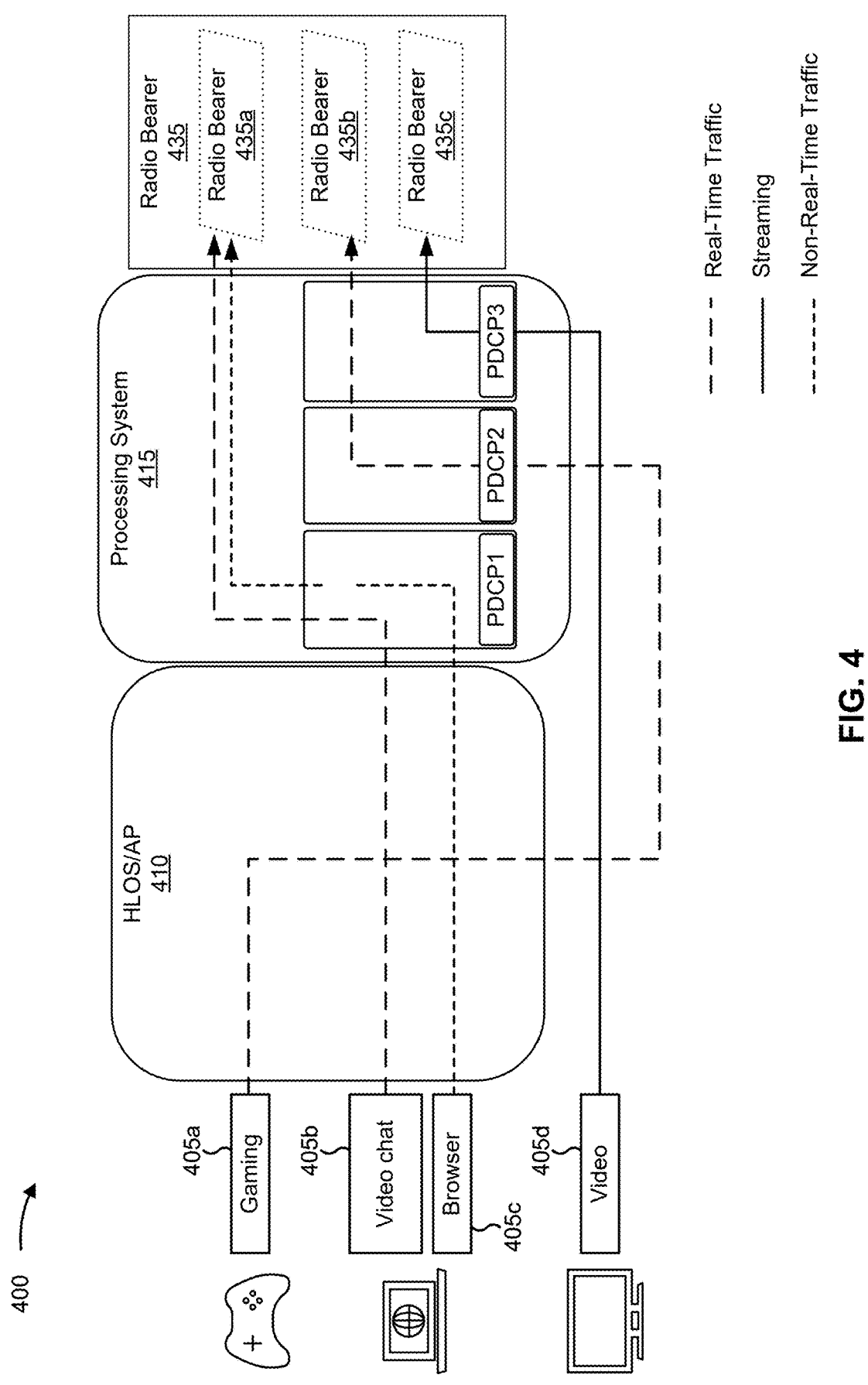
FIG. 4 is a diagram illustrating an example associated with UE software architecture, in accordance with the present disclosure.

FIG. 4 is a diagram illustrating an example 400 associated with UE software architecture, in accordance with the present disclosure.

The example 400 may include various data paths 405, such as gaming data traffic 405a, video chat data traffic 405b, browser data traffic 405c, and/or video streaming data traffic 405d, among other examples. A data path 405 (e.g., gaming data traffic 405a, video chat data traffic 405b, browser data traffic 405c, and/or video streaming data traffic 405d) may be an example of a traffic flow of a UE (e.g., UE 120) operating in accordance with a PDN. The UE 120 may include an HLOS/AP 410 and a processing system 415 (e.g., which may include a modem 254 as described with reference to FIG. 1), each of which may perform one or more operations for processing and communicating one or more data packets of any of the traffic flows associated with the gaming data traffic 405a, video chat data traffic 405b, browser data traffic 405c, and/or video streaming data traffic 405d, among other examples. The processing system 415 may include one or more packet data convergence protocol (PDCP) entities, such as PDCP1, PDCP2, and PDCP3. The one or more PDCP entities may transfer user plane data (e.g., the one or more data packets of any of the traffic flows associated with the gaming data traffic 405a, video chat data traffic 405b, browser data traffic 405c, and/or video streaming data traffic 405d) to a radio bearer 435 (e.g., the one or more PDCP entities may transfer user plane data to one or more respective radio bearers 435).

In some examples, the processing system 415 may route traffic to a single radio bearer 435 or may route different types of traffic to corresponding radio bearers 435 (e.g., radio bearer 435a, radio bearer 435b, and/or radio bearer 435c). For example, the radio bearer(s) 435 may be examples of a logical channel that is associated with the transportation or transmission of user data and control data between the UE 120 and a network node (e.g., network node 110). Each radio bearer 435 may be associated with a network slice for communicating certain types of traffic. "Network slice" refers to a shared physical network that may provide flexibility in the use and allocation of network resources. Each network slice of a network may have a corresponding logical topology, one or more security rules, and/or one or more performance characteristics (e.g., within any limits associated by the underlying physical networks), among other examples. Different network slices may be dedicated to different purposes, such as ensuring that a specific application or service gets priority access to capacity and delivery, or isolating traffic for specific users or device classes.

For example, in the example of FIG. 4, radio bearer 435a may be associated with a "normal" network slice dedicated to the transmission of data traffic having default considerations and/or a default priority in regard to being communicated via radio bearer (e.g., in comparison to larger amounts of data, real-time data, streaming data, among other examples). Radio bearer 435b may be associated with a low latency network slice dedicated to the transmission of data traffic having considerations and/or a different priority for supporting low latency communication of such data traffic (e.g., in comparison to larger amounts of data, "normal" data, streaming data, among other examples). Radio bearer 435c may be associated with a streaming network slice dedicated to the transmission of data traffic having considerations and/or a different priority for supporting video streaming (e.g., in comparison to larger amounts of data, real-time data, "normal" data, among other examples). Other types of traffic that may have corresponding considerations and/or priorities, and thus may be communicated via dedicated radio bearer and/or via a dedicated network slice, may include URLLC, massive MIMO, eMTC, and/or cMBB, among other examples.

In the example 400, a particular radio bearer 435 may be prioritized such that some traffic may be prioritized by being routed through that particular radio bearer 435 and transmitted via the radio bearer 435 without being queued behind lower priority traffic. For example, lower priority traffic may be routed through a first radio bearer 435 and may not impede transmission of the higher priority traffic (e.g., which may be routed through a second radio bearer 435 having a higher priority than the first radio bearer).

In a first example, gaming data traffic 405a may be associated with a first application of the UE 120. The HLOS/AP 410 may obtain data for the gaming data traffic 405a via an API of the first application, which may mark the data as higher priority, low latency, and/or real-time data. The HLOS/AP 410 may cause the data to be provided to a radio bearer 435b (e.g., via PDCP2 of the processing system 415) associated with a low latency network slice. Alternatively, the HLOS/AP 410 may obtain data for the gaming data traffic 405a via the API of the first application. The HLOS/AP 410 may cause the data to be provided to a single radio bearer 435 via a PDCP entity of the processing system 415. In such examples, the gaming data traffic 405a may be queued ahead of or behind other traffic obtained by the processing system 415 prior to the gaming data traffic 405a regardless of traffic type. That is, the API of the first application may not be configured to assign a priority to the gaming data traffic 405a.

In a second example, video chat data traffic 405b may be associated with a second application of the UE 120. The HLOS/AP 410 may obtain data for the video chat data traffic 405b via an API of the second application, which may mark the video chat data traffic 405b as higher priority, low latency, and/or real-time data. The HLOS/AP 410 may cause the data to be provided to a radio bearer 435a (e.g., via PDCP1 of the processing system 415). For example, the radio bearer 435a may be associated with "normal" data communications or data flows. However, because the radio bearer 435a may not be queued with a data flow at the time the video chat data traffic 405b is being queued, the processing system 415 may determine to output the video chat data traffic 405b through an empty radio bearer (e.g., radio bearer 435a or any other radio bearer 435 for which an associated queue is empty or not yet queued with data) despite the radio bearer 435a being associated with lower priority traffic and/or lower priority network slice.

Alternatively, the HLOS/AP 410 may obtain data for the video chat data traffic 405b via an API of the second application. The HLOS/AP 410 may cause the data to be provided to a single radio bearer 435 via a PDCP entity of the processing system 415. In such examples, video chat data traffic 405b may be queued ahead of or behind the gaming data traffic 405a regardless of traffic type. That is, the API may not be configured to assign a priority to video chat data traffic 405b.

In a third example, browser data traffic 405c may be associated with the second application or a third application of the UE 120. For example, video chat data traffic 405b may be obtained via a web browser application along with browser data traffic 405c or may be obtained via a separate application for video chatting. The HLOS/AP 410 may obtain data for the browser data traffic 405c via the API of the second application or an API of the third application, which may mark the browser data traffic 405c as lower priority. The HLOS/AP 410 may cause the data to be provided to a radio bearer 435a (e.g., via PDCP1 of the processing system 415). For example, the radio bearer 435a may be associated with "normal" data communications or data flows.

Alternatively, the HLOS/AP 410 may obtain data for the browser data traffic 405c via the API of the second application or the third application. The HLOS/AP 410 may cause the data to be provided to a single radio bearer 435 via a PDCP entity of the processing system 415. In such examples, browser data traffic 405c may be queued behind the gaming data traffic 405a and/or the video chat data traffic 405b or browser data traffic 405c may be queued ahead of the gaming data traffic 405a and/or the video chat data traffic 405b, regardless of traffic type. That is, the API may not be configured to assign a priority to browser data traffic 405c and thus may be queued in the order obtained by the processing system 415.

In a fourth example, video streaming data traffic 405d may be associated with a fourth application of the UE 120. The HLOS/AP 410 may obtain data for the gaming data traffic 405a via an API of the third application which may marked the data priority associated with video streaming. The HLOS/AP 410 may cause the data to be output to a radio bearer 435c (e.g., via PDCP3 of the processing system 415) associated with a streaming network slice.

Alternatively, the HLOS/AP 410 may obtain data for the video streaming data traffic 405d via the API of the third application. The HLOS/AP 410 may cause the data to be output to a single radio bearer 435 via a PDCP entity of the processing system 415. In such examples, video streaming data traffic 405d may be queued ahead of or behind the gaming data traffic 405a, the video chat data traffic 405b, and/or the browser data traffic 405c regardless of traffic type. That is, the API of the fourth application may not be configured to assign a priority to video streaming data traffic 405d.

As described, each application of the UE 120 may or may not be configured to route corresponding traffic through particular radio bearers by using an auxiliary interface (e.g., API) to appropriately identify higher-priority traffic and to route the traffic by priority. A vendor of each application may implement the interface within an application configuration to effectively prioritize traffic via multiple radio bearers and thus, to consistently prioritize real-time traffic (e.g., traffic for which user experience is sensitive to lag or delay), implementations may require a high percentage of participation by application vendors to effectively prioritize traffic communication across applications. As a result, without high percentages of participation or implementation of an auxiliary API, the prioritization of real-time traffic may be inconsistent or non-existent, or may be implemented on an application-by-application basis, which may negatively affect latency, reliability, and/or user experience.

Although the traffic described herein may be described as data traffic, any of the protocols, procedures or processes described herein may similarly apply to control plane traffic or other types of traffic (e.g., gaming control traffic, video chat control traffic, browser control traffic, and/or video streaming control traffic).

As indicated above, FIG. 4 is provided as an example. Other examples may differ from what is described with respect to FIG. 4.

Figure 5:
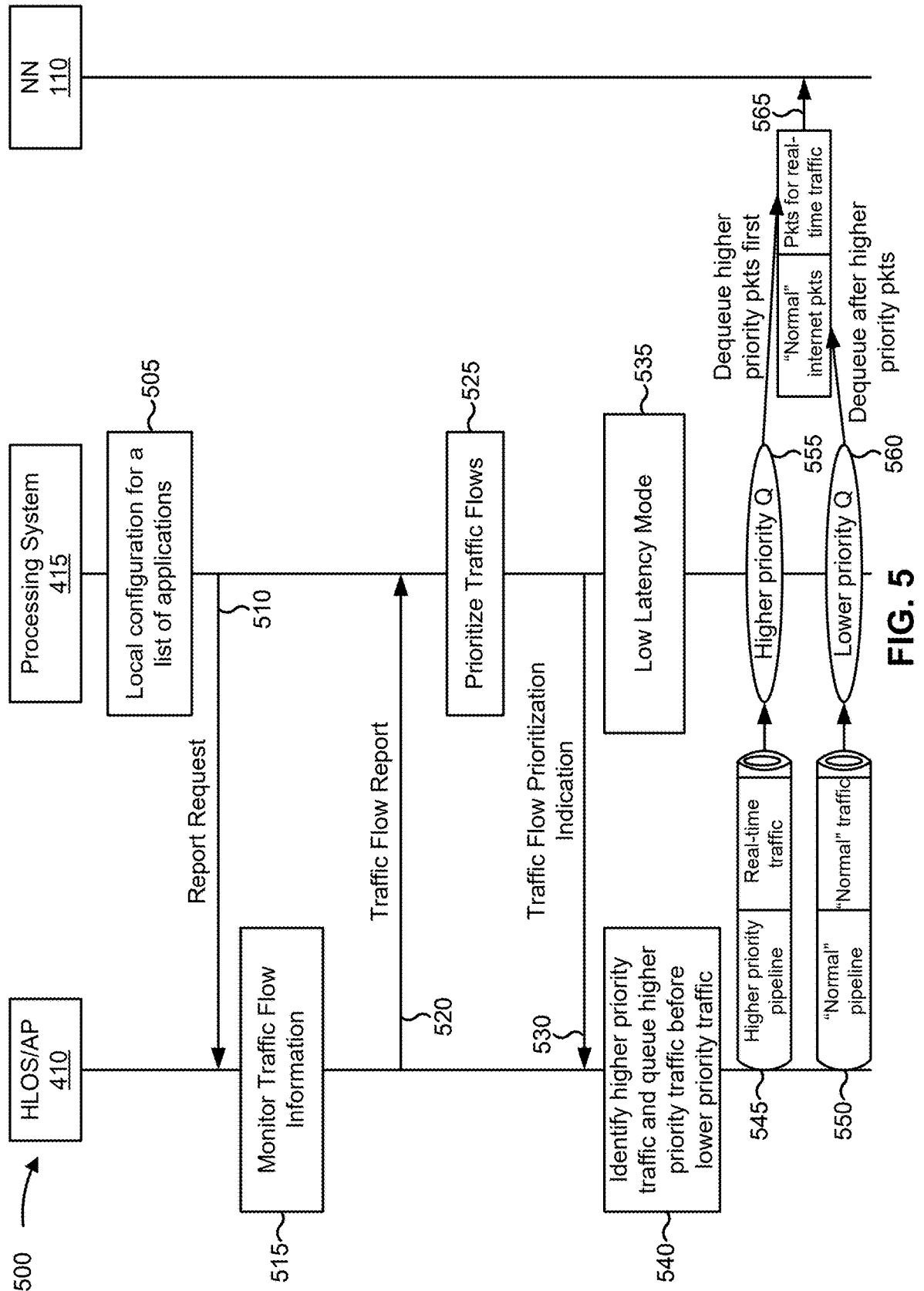
FIG. 5 is a diagram of an example associated with real-time internet traffic detecting and prioritizing, in accordance with the present disclosure.

FIG. 5 is a diagram of an example 500 associated with real-time internet traffic detecting and prioritizing, in accordance with the present disclosure. As shown in FIG. 5, a network node (e.g., network node 110, a CU, a DU, and/or an RU) may communicate with one or more entities of a UE (e.g., UE 120). For example, the UE may include a first entity (e.g., processing system 415) and a second entity (e.g., HLOS/AP 410) that are in communication with each other via one or more protocols supported by the UE. In some aspects, the network node and the UE (e.g., including entities such as the processing system 415 and the HLOS/AP 410) may be part of a wireless network (e.g., wireless communication network 100). The UE and the network node 110 may have established a wireless connection (e.g., via one or more other entities of the UE) prior to operations shown in FIG. 5.

As shown by reference number 505, the processing system 415 may include or access a configuration (e.g., locally stored by the UE and/or accessed via cloud-storage) for a list of applications. For example, the processing system 415 may identify, from the list of applications indicated by the configuration, a set of one or more applications stored by the UE. In some aspects, the list of applications may include a list of IP tuples (e.g., a bundle of five values (or another quantity of values) that identifies a specific application), each corresponding to an application of the UE. Each application of the set of one or more applications may be configured or enabled to communicate one or more traffic types (e.g., real-time, and/or non-real-time, each of which may include subcategories of traffic types).

In some aspects, each application of the set of one or more applications may be configured with, or otherwise associated with, a traffic type that may generally be more affected by delays in communication (e.g., may be prioritized or associated with higher priority communications). For example, each application of the set of one or more applications may be enabled or configured to communicate higher priority traffic, such as real-time communications. Real-time communications traffic may include fixed line telephony, mobile telephony, teleconferencing, video calling, video chat and/or conferencing, VoIP, gaming, live video streaming, file sharing, screen sharing, automatic, live meeting transcription, multi-user text messaging, live customer service chat, robotic telepresence, and/or two-way or multi-way radio, among other examples. Additionally, some categories of real-time communications traffic may have a higher or lower priority than other types of real-time communications traffic. In such examples, the configuration may indicate a corresponding priority for different categories of real-time communications traffic.

In some aspects, the list may include (e.g., and/or indicate) applications that may be additionally configured with one or more different traffic types other than the higher priority traffic type (e.g., one or more non-real-time traffic types in addition to the real-time traffic type). In some aspects, the list may include applications that may not be configured with the higher priority traffic type (e.g., may not be configured to communicate real-time traffic), but may be configured with other types of traffic that may be prioritized over default data traffic and deprioritized for higher priority traffic. For example, the list may include applications configured with traffic types that are associated with communications having a priority that is higher than that of default data traffic (e.g., default traffic, normal traffic, and/or baseline traffic) but may not be as high of a priority as the higher priority traffic (e.g., real-time traffic).

That is, the list may include one or more applications configured at least for real-time traffic and/or may include one or more applications configured for any type of traffic. The configuration may indicate which types of traffic each application is configured to communicate. In some aspects, the configuration may indicate or include a hierarchy of traffic types (e.g., may indicate which types of traffic are to be prioritized over others) and/or may indicate a hierarchy of categories within a traffic type (e.g., may indicate which categories of real-time and/or non-real-time traffic are to be prioritized over other categories of the same traffic type). As an example, emergency VOIP services may be prioritized over gaming traffic, gaming traffic may be prioritized over screen sharing in some scenarios, and/or live customer service chat may be prioritized over robotic telepresence, among other examples.

Additionally, or alternatively, the configuration may be specific to the UE such that a vendor or an original equipment manufacturer (OEM) of the UE may select which types of traffic to prioritize based on an intended use of the UE. For example, the configuration for a gaming device may prioritize gaming and multi-user text messaging over file sharing, the configuration of a satellite communication device may prioritize emergency VoIP services over any other type of data packet traffic, and so on.

As shown by reference number 510, the processing system 415 may output, and the HLOS/AP 410 may obtain, a report request. For example, the processing system 415 may provide, and the HLOS/AP 410 may obtain, a report request in accordance with the configuration that requests traffic flow information from the HLOS/AP 410 for each application of the set of one or more applications (e.g., the report request may include an application list field. In some aspects, the report request may include a report periodicity (e.g., the report request may include a report periodicity field (e.g., "Report_periodicity: N" where N may equal a quantity of seconds). For example, the report periodicity may indicate how often or at what time interval the HLOS/AP 410 is instructed to provide a traffic flow report.

As shown by reference number 515, the HLOS/AP 410 may monitor for traffic flow information. For example, the HLOS/AP 410 may monitor for the traffic flow information in association with the report request provided by the processing system 415. That is, the HLOS/AP 410 may monitor for each application of the set of one or more applications and may obtain traffic flow information for each application of the set of one or more applications. Traffic flow information may include a default set of traffic statistics or may include a set of one or more traffic statistics indicated by the configuration and/or the report request. The HLOS/AP 410 may monitor each application of the set of applications to determine whether there is a traffic flow (e.g., data being prepared for communication, communicated, or processed for communication) associated with the application.

As shown by reference number 520, the HLOS/AP 410 may output, and the processing system 415 may obtain, a traffic flow report. For example, the HLOS/AP 410 may provide, to the processing system 415, the traffic flow report including the traffic flow information (e.g., monitored traffic flow information for each application of the one or more applications, as shown by reference number 515). Thus, the processing system 415 may receive or obtain, in association with the report request, a traffic flow report comprising the traffic flow information. The traffic flow information for each application of the one or more applications may include traffic statistics for that application. For example, the traffic flow information for a given application may include an indication of the associated application (e.g., an IP tuple of the associated application), a quantity of uplink data traffic units, a quantity of downlink data traffic units, and/or a corresponding traffic type, among other examples. In some aspects, the traffic report may additionally include traffic flow information for applications other than the one or more applications (e.g., applications for which non-real-time traffic may not be supported, as described in connection with reference number 505). Thus, the traffic report may indicate one or more applications for which a traffic flow is present and or whether the traffic flow is associated with a higher priority traffic type.

As shown by reference number 525, the processing system 415 may prioritize one or more traffic flows (e.g., traffic flows, series of data packets or data to be packetized, traffic associated with any of data paths 405, and/or traffic associated with any of data paths 705, as described with reference to FIG. 4 and FIG. 7, respectively, among other examples). For example, the processing system 415 may identify a first traffic flow of the UE (e.g., associated with a first application of the UE) in accordance with receiving the traffic flow report including the traffic flow information for the first application. In some aspects, the processing system 415 may identify one or more traffic flows to associate with (e.g., assign) a first priority according to the traffic flow report. The first priority may be indicative of a relatively higher priority than other priorities and, in some aspects, may be a highest priority (meaning that no other traffic types may be prioritized over traffic types having the first priority). In some aspects, the processing system 415 may identify one or more other traffic flows to associate with (e.g., assign) a different priority according to the traffic flow report. For example, the processing system 415 may assign a higher priority to traffic flows associated with real-time traffic and may not assign a priority to other traffic flows associated with other traffic types. In other examples, the processing system 415 may assign a set of relative priorities to traffic flows of a set of traffic flows associated with real-time traffic and/or non-real-time traffic such that the set of traffic flows is relatively prioritized.

As shown by reference number 530, the processing system 415 may output, and the HLOS/AP 410 may obtain, a traffic flow prioritization indication. For example, the processing system 415 may provide, and the HLOS/AP 410 may obtain, an indication that the first traffic flow is associated with the first priority. For example, the traffic flow prioritization indication may include an IP tuple for the application associated with the first traffic flow and/or a different identifier of the traffic flow (e.g., in the case that a single application is associated with multiple traffic flows having different traffic types or categories) and/or may include an indication of the first traffic flow being assigned with first priority. In some aspects, the traffic flow prioritization indication may include an indication of one or more traffic flows (e.g., including the first traffic flow) for the HLOS/AP 410 to associate with the first priority. In some aspects, the traffic flow prioritization indication may include an indication of the set of relatively prioritized traffic flows.

As shown by reference number 535, the processing system 415 may enter a low latency mode. For example, the processing system 415 may enable a low latency mode of the UE in association with providing the indication of the first traffic flow (e.g., via the traffic flow prioritization indication as shown by reference number 530). Enabling the low latency mode may prompt the UE, the processing system 415 of the UE, or any other module or entity of the UE to perform or enable one or more actions and/or protocols that may support the communication of traffic according to a low latency mode (e.g., a mode in which low latency communication is a higher priority objective of the UE), as described below with reference to FIG. 8. In some aspects, entering the low latency mode may include disabling a deep sleep mode of the UE, enabling a fast or quick acknowledgement (e.g., RLC fast negative acknowledgement (NACK)) protocol, and/or performing an RRC connection extension, among other examples.

As shown by reference number 540, the HLOS/AP 410 may identify higher priority traffic and queue the higher priority traffic before lower priority traffic. For example, the HLOS/AP 410 may assign, indicate, or mark the first traffic flow with the first priority according to the traffic flow prioritization indication. In some aspects, the HLOS/AP 410 may assign, indicate, or mark the one or more traffic flows (e.g., including the first traffic flow) indicated by the traffic flow prioritization indication with the first priority.

As shown by reference number 545, the HLOS/AP 410 may route, and the processing system 415 may obtain, higher priority traffic (e.g., one or more data packets), such as traffic including real-time traffic, through a higher priority pipeline (e.g., low latency pipeline 740*a* and/or high priority pipeline 740*b* as described below with reference to FIG. 7, among other examples). For example, the HLOS/AP 410 may route traffic associated with the one or more traffic flows (e.g., the one or more traffic flows marked with the first priority) through the higher priority pipeline. In some aspects, the higher priority pipeline is a high-speed pipeline. "Pipeline" as used herein may be used interchangeably with "data packet pipeline," and/or "pipe."

As shown by reference number 550, the HLOS/AP may route, and the processing system 415 may obtain, lower priority traffic, such as traffic including non-real-time traffic, through a normal or lower priority pipeline (e.g., normal pipeline 740*c* as described with reference to FIG. 7, a streaming pipeline, and/or a normal traffic pipeline) among other examples). For example, the HLOS/AP 410 may route all other traffic (e.g., traffic not associated with the one or more traffic flows marked with the first priority) through the lower priority pipeline. In some other examples, the HLOS/AP 410 may route traffic associated with traffic flows marked with a relatively lower priority through the lower priority pipeline. In some aspects, the lower priority pipeline may be a low-speed pipeline and/or a normal-speed pipeline.

In the example where the traffic flow prioritization indication may include an indication of a set of relatively prioritized traffic flows, the HLOS/AP 410 may route traffic through one or more pipelines according to the relative priorities of each associated traffic flow. For example, traffic from traffic flows marked with a highest priority and a next highest priority may be routed through the high priority pipeline and/or routed in order of priority (e.g., highest priority traffic routed first). In such examples, traffic from traffic flows marked with a lowest priority and a next lowest priority may be routed through the low priority pipeline and/or routed in order of priority (e.g., higher (e.g., second lowest) priority traffic routed first), and so on.

As shown by reference number 555, the processing system 415 may obtain higher priority traffic and may queue the higher priority traffic into a higher priority queue (e.g., based on obtaining the higher priority traffic via the higher priority pipeline). For example, the processing system 415 may obtain, from the HLOS/AP 410 (e.g., via the high priority pipeline), a first data packet associated with the first traffic flow. In some aspects, the processing system 415 may queue the first data packet in a first queue. In some aspects, the first queue may include a low latency queue or a high priority queue.

As shown by reference number 560, the processing system 415 may obtain lower priority traffic and may queue the higher priority traffic into a lower priority queue (e.g., based on obtaining the lower priority traffic via the lower priority pipeline (e.g., via the "normal" pipeline)). For example, the processing system 415 may obtain, from the HLOS/AP 410 (e.g., via the normal priority pipeline), a second data packet associated with a second traffic flow that is associated with a second priority. In some aspects, the second data packet is queued in a second queue, and the first priority is a higher priority than the second priority. In some aspects, the first queue and the second queue are a same queue, and the first data packet is queued ahead of the second data packet in the same queue in association with the first priority being higher than the second priority. In some aspects, the first queue is associated with a first radio bearer and the second queue is associated with a second radio bearer, as described in more detail with reference to FIG. 7.

In some aspects, the first data packet and the second data packet may be associated with a same application configured to execute on the UE (e.g., the flows associated with the first data packet and the second data packet may be associated with an appropriate priority). In some aspects, the first data packet and the second data packet are associated with different applications, each stored by the UE (e.g., the application and/or the flows associated with the first data packet and the second data packet may be associated with an appropriate priority). In some aspects, the first traffic flow comprises real-time traffic or low latency traffic, and the second traffic flow comprises normal latency traffic.

As shown by reference number 565, the processing system 415 may output, for transmission to the network node 110, higher priority traffic (e.g., real-time data packets) by dequeuing the higher priority packets prior to dequeuing the lower priority packets. Thus, the network node 110 may receive the higher priority packets prior to receiving the lower priority packets. In some examples, the UE may transmit, and the network node 110 may receive, the first data packet prior to the second data packet in association with the first data packet being queued in the first queue and/or dequeued before the second data packet in the same queue. In some examples, the processing system 415 may output the first data packet for transmission first, even though the second data may, in some examples, be obtained by the processing system 415 before the first data packet.

Although example 500 is shown in the context of uplink data, the HLOS/AP 410, the processing system 415, and/or the network node 110 may perform similar operations in a same or different order for prioritizing real-time downlink data or sidelink data. For example, the UE (e.g., any entity of the UE) may receive, and the network node 110 may transmit, a third data packet and a fourth data packet. The processing system 415 may identify that a third traffic flow associated with the third data packet is associated with a traffic type and a first priority (e.g., a higher and/or highest priority compared to one or more priorities associated with different traffic types). In some aspects, identifying the third traffic flow and/or the third data packet is associated with the traffic type, and the first priority may be based on the configuration of the UE (e.g., as shown with regard to reference number 505). The processing system 415 may provide, and the HLOS/AP 410 may obtain, the third data packet prior to the fourth data packet in association with the third traffic flow being associated with the first priority.

As indicated above, FIG. 5 is provided as an example. Other examples may differ from what is described with respect to FIG. 5.

Figure 6:
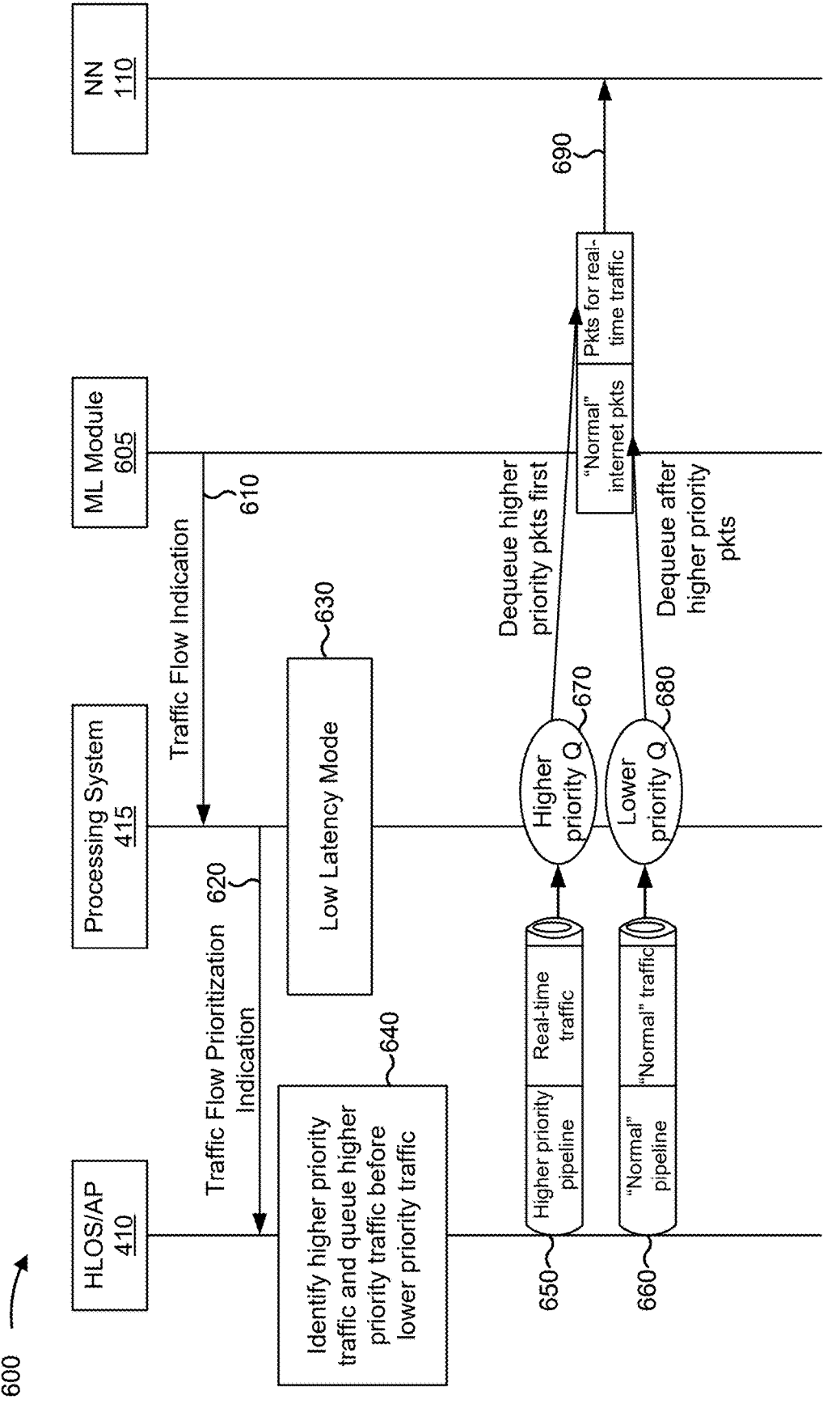
FIG. 6 is a diagram of an example associated with real-time internet traffic detecting and prioritizing using one or more artificial intelligence and/or machine learning (AI/ML) outputs, in accordance with the present disclosure.

FIG. 6 is a diagram of an example 600 associated with real-time internet traffic detecting and prioritizing using one or more AI/ML outputs, in accordance with the present disclosure. As shown in FIG. 6, a network node (e.g., network node 110, a CU, a DU, and/or an RU) may communicate with one or more entities of a UE (e.g., UE 120). For example, the UE may include a first entity (e.g., processing system 415), a second entity (e.g., an HLOS/AP 410), and/or a third entity (e.g., an ML module 605) that are in communication with each other via one or more protocols supported by the UE. In some examples, the UE may include or be communicatively coupled with the ML module 605 (e.g., where the ML module may obtain information and/or predictions from an AI/ML model (e.g., as described with reference to FIG. 9) deployed via the ML module 605). In some other examples, a separate entity or device in wireless communication with the UE, such as a server or a device included in a cloud computing deployment, may include the ML module 605. Therefore, the AL/ML model may be executed separately from the UE.

In some aspects, the network node 110 and the UE (e.g., including entities, such as the processing system 415, the HLOS/AP 410, and the ML module 605) may be part of a wireless network (e.g., wireless communication network 100). The UE and the network node 110 may have established a wireless connection (e.g., via one or more other entities of the UE) prior to operations shown in FIG. 6. Definitions for terms used in the context of example 500 of FIG. 5 may similarly apply to equivalent or similar phrases used in the context of example 600.

As shown by reference number 610, the processing system 415 may obtain, and the ML module 605 may output, a traffic flow indication. For example, the traffic flow indication (e.g., an indication of one or more traffic flows) may be an output of the AI/ML model deployed via the ML module 605. In some aspects, the ML module 605 may detect traffic (e.g., associated with one or more traffic flows and/or applications of the UE) associated with a traffic type (e.g., real-time, high-priority, low-latency traffic) and may inform the processing system 415 that such traffic (e.g., having the traffic type) is detected. In some aspects, the processing system 415 may obtain, from the ML module 605 of the UE, a first indication of one or more traffic flows and one or more corresponding traffic types. The processing system 415 may identify that a first traffic flow is associated with a first traffic type based on obtaining the first indication of the one or more traffic flows and the one or more corresponding traffic types. In some aspects, the ML module 605 may assign and/or indicate via the traffic flow indication a set of relative priorities for traffic flows of a set of traffic flows (e.g., identified by the ML module 605) associated with real-time traffic and/or non-real-time traffic such that the set of traffic flows is relatively prioritized.

As shown by reference number 620, the processing system 415 may output, and the HLOS/AP 410 may obtain, a traffic flow prioritization indication. In some aspects, the processing system 415 may provide a second indication that the one or more traffic flows (e.g., indicated by the ML module 605) are associated with a first priority, wherein the one or more traffic flows include the first traffic flow. For example, the traffic flow prioritization indication may include an IP tuple for the application associated with the first traffic flow and/or a different identifier of the traffic flow (e.g., in the case that a single application is associated with multiple traffic flows having different traffic types or categories) and/or may include an indication of the first traffic flow being assigned a first priority. In some aspects, the traffic flow prioritization indication may include an indication of one or more traffic flows (e.g., including the first traffic flow) for the HLOS/AP 410 to associate with the first priority. In some aspects, the traffic flow prioritization indication may include an indication of the set of relatively prioritized traffic flows.

As shown by reference number 630, the processing system 415 may enter a low latency mode. For example, the processing system 415 may enable a low latency mode of the UE in association with providing the indication of the first traffic flow (e.g., via the traffic flow prioritization indication as shown by reference number 620). Enabling the low latency mode may prompt the UE, the processing system 415 of the UE, or any other module or entity of the UE to perform or enable one or more actions and/or protocols that may support the communication of traffic according to a low latency mode (e.g., a mode in which low latency communication is a higher priority objective of the UE), as described with reference to FIG. 8. In some aspects, entering the low latency mode may include disabling a deep sleep mode of the UE, enabling a fast or quick acknowledgement (e.g., RLC fast NACK) protocol, and/or performing an RRC connection extension.

As shown by reference number 640, the HLOS/AP 410 may identify higher priority traffic and queue the higher priority traffic before lower priority traffic. For example, the HLOS/AP 410 may assign, indicate, or mark the first traffic flow with the first priority according to the traffic flow prioritization indication. In some aspects, the HLOS/AP 410 may assign, indicate, or mark the one or more traffic flows (e.g., including the first traffic flow) indicated by the traffic flow prioritization indication with the first priority.

As shown by reference number 650, the HLOS/AP 410 may route higher priority traffic, such as traffic including real-time traffic, through a higher priority pipeline (e.g., low latency pipeline 740a and/or high priority pipeline 740b as described with reference to FIG. 7, among other examples). For example, the HLOS/AP 410 may route traffic associated with the one or more traffic flows (e.g., the one or more traffic flows marked with the first priority) through the higher priority pipeline. In some aspects, the higher priority pipeline is a high-speed pipeline.

As shown by reference number 660, the HLOS/AP may route, and the processing system 415 may obtain, lower priority traffic, such as traffic including non-real-time traffic, through a lower priority pipeline (e.g., normal pipeline 740c as described with reference to FIG. 7, a streaming pipeline, and/or a normal traffic pipeline, among other examples). For example, the HLOS/AP 410 may route all other traffic (e.g., traffic not associated with the one or more traffic flows marked with the first priority) through the lower priority pipeline. In some other examples, the HLOS/AP 410 may route traffic associated with traffic flows marked with a relatively lower priority through the lower priority pipeline. In some aspects, the lower priority pipeline may be a low-speed pipeline and/or a normal-speed pipeline.

In the example where the traffic flow prioritization indication may include an indication of a set of relatively prioritized traffic flows, the HLOS/AP 410 may route traffic through one or more pipelines according to the relative priorities of each associated traffic flow. For example, traffic from traffic flows marked with a highest priority and a next highest priority may be routed through the high priority pipeline and/or routed in order of priority (e.g., highest priority traffic routed first). In such examples, traffic from traffic flows marked with a lowest priority and a next lowest priority may be routed through the low priority pipeline and/or routed in order of priority (e.g., higher (e.g., second lowest) priority traffic routed first), and so on.

As shown by reference number 670, the processing system 415 may obtain higher priority traffic and may queue the higher priority traffic into a higher priority queue (e.g., based on obtaining the higher priority traffic via the higher priority pipeline). For example, the processing system 415 may obtain, from the HLOS/AP 410 (e.g., via the high priority pipeline), a first data packet associated with the first traffic flow. In some aspects, the processing system 415 may queue the first data packet in a first queue. In some aspects, the first queue may include a low latency queue or a high priority queue.

As shown by reference number 680, the processing system 415 may obtain lower priority traffic and may queue the lower priority traffic into a lower priority queue (e.g., based on obtaining the lower priority traffic via the lower priority pipeline (e.g., via the "normal" pipeline)). For example, the processing system 415 may obtain, from the HLOS/AP 410 (e.g., via the normal priority pipeline), a second data packet associated with a second traffic flow that is associated with a second priority. In some aspects, the second data packet is queued in a second queue, and the first priority is a higher priority than the second priority. In some aspects, the first queue and the second queue are a same queue, and the first data packet is queued ahead of the second data packet in the same queue in association with the first priority being higher than the second priority. In some aspects, the first queue is associated with a first radio bearer and the second queue is associated with a second radio bearer, as described in more detail with reference to FIG. 7.

In some aspects, the first data packet and the second data packet may be associated with a same application configured to execute on the UE (e.g., the flows associated with the first data packet and the second data packet may be associated with an appropriate priority). In some aspects, the first data packet and the second data packet are associated with different applications, each stored by the UE (e.g., the application and/or the flows associated with the first data packet and the second data packet may be associated with an appropriate priority). In some aspects, the first traffic flow comprises real-time traffic or low latency traffic, and the second traffic flow comprises normal latency traffic.

As shown by reference number 690, the processing system 415 may output, for transmission to the network node 110, higher priority traffic (e.g., real-time data packets) by dequeuing the higher priority packets prior to dequeuing the lower priority packets. Thus, the network node may receive the higher priority packets prior to receiving the lower priority packets. For example, the UE may transmit, and the network node 110 may receive, the first data packet prior to the second data packet in association with the first data packet being queued in the first queue and/or dequeued before the second data packet in the same queue.

Although example 600 is shown in the context of uplink data, the HLOS/AP 410, the processing system 415, and/or the network node 110 may perform similar operations in a same or different order for prioritizing real-time downlink data or sidelink data using the ML module 605. For example, the UE (e.g., any entity of the UE) may receive, and the network node 110 may transmit, a third data packet and a fourth data packet. The processing system 415 may identify that a third traffic flow associated with the third data packet is associated with a traffic type and a first priority (e.g., a higher and/or highest priority compared to one or more priorities associated with different traffic types). In some aspects, identifying the third traffic flow and/or the third data packet is associated with the traffic type, and the first priority may be based on or according to information output by the ML module 605. For example, the ML module 605 may identify that the third packet is associated with real-time traffic and may provide a traffic flow information indication to the processing system 415 including information relating to the third packet and/or the fourth packet. The processing system 415 may provide, and the HLOS/AP 410 may obtain, the third data packet prior to the fourth data packet in association with the third traffic flow being associated with the first priority.

As indicated above, FIG. 6 is provided as an example. Other examples may differ from what is described with respect to FIG. 6.

Figure 7:
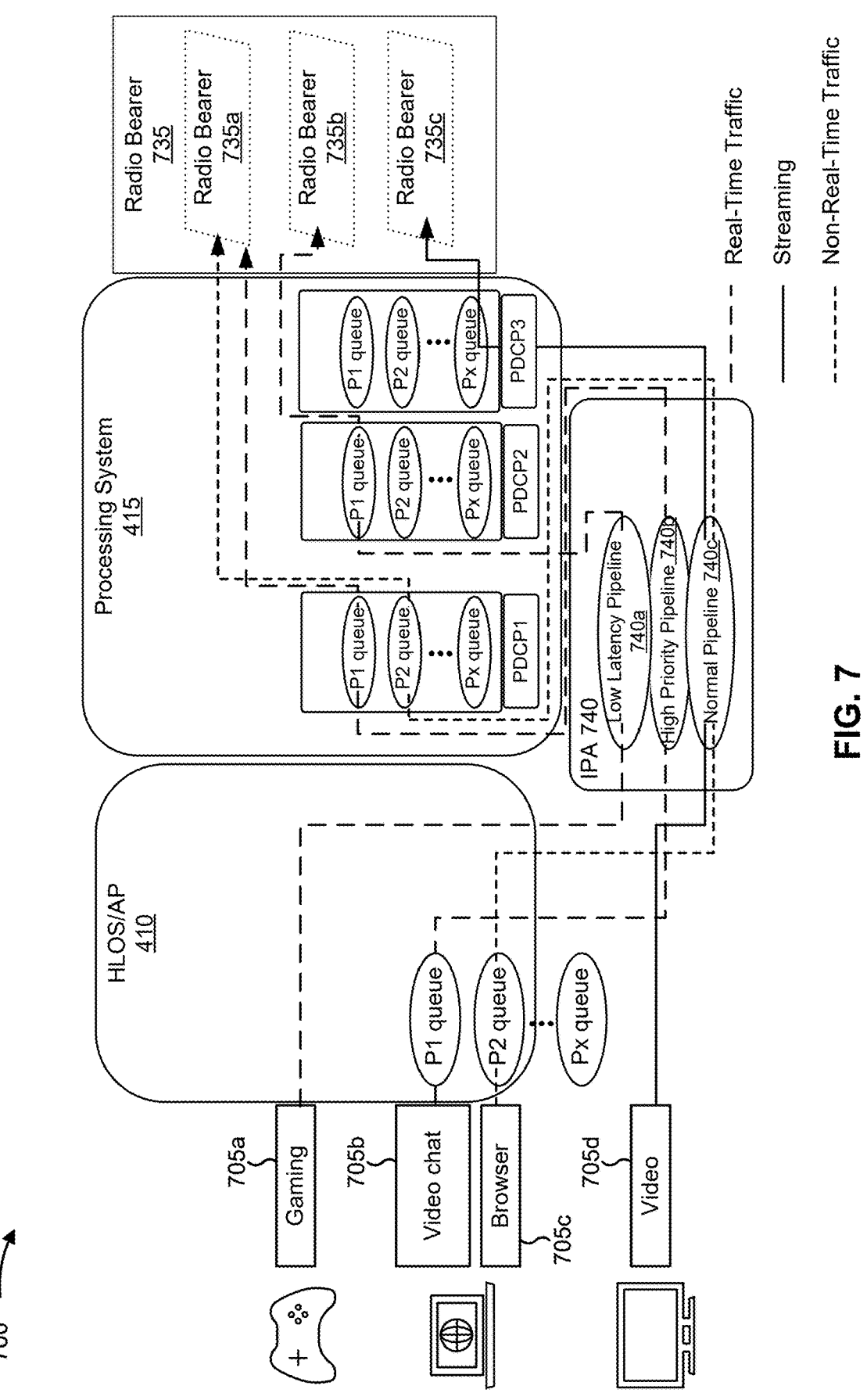
FIG. 7 is a diagram illustrating an example associated with UE software architecture, in accordance with the present disclosure.

FIG. 7 is a diagram illustrating an example 700 associated with UE software architecture, in accordance with the present disclosure.

The example 700 may include various data paths 705, such as gaming data traffic 705a, video chat data traffic 705b, browser data traffic 705c, and/or video streaming data traffic 705d, among other examples. A data path 705 (e.g., gaming data traffic 705a, video chat data traffic 705b, browser data traffic 705c, and/or video streaming data traffic 705d) may be an example of a traffic flow of a UE (e.g., UE 120) operating in accordance with a PDN. The UE 120 may include an HLOS/AP 410, a processing system 415 (e.g., which may include a modem 254 as described with reference to FIG. 2), and an internet packet accelerator (IPA) 740, each of which may perform one or more operations for processing and communicating one or more data packets of any of the traffic flows associated with the gaming data traffic 705a, video chat data traffic 705b, browser data traffic 705c, and/or video streaming data traffic 705d, among other examples.

The processing system 415 may include one or more PDCP entities, such as PDCP1, PDCP2, and PDCP3. The one or more PDCP entities may transfer user plane data (e.g., the one or more data packets of any of the traffic flows associated with the gaming data traffic 705a, video chat data traffic 705b, browser data traffic 405c, and/or video streaming data traffic 705d) to a radio bearer 735 (e.g., the one or more PDCP entities may transfer user plane data to one or more respective radio bearers 735). Each PDCP entity may be associated with a set of queues for routing traffic. For example, each PDCP entity may be associated with a P1 queue, a P2 queue, through a Px queue, where each queue may be associated with a respective priority such that a traffic flow having a corresponding priority may be queued into the respective queue. The IPA 740 may include pipelines, such as low latency pipeline 740a, high priority pipeline 740b, and normal pipeline 740c, for routing traffic into an appropriate queue of a PDCP entity according to a priority associated with the traffic.

In some aspects, the processing system 415 may include a controller and/or manager which may instruct a peer entity of the HLOS/AP 410 to monitor (e.g., using an HLOS and/or one or more APIs) applications that may be commonly used for, or associated with, real-time communications traffic (e.g., applications associated with gaming data traffic 405a, and/or video chat data traffic 405b). The controller and/or manager of the processing system 415 may further instruct the peer entity of the HLOS/AP 410 to identify IP tuples used by the applications that may be commonly used for or associated with real-time communications. For example, when any such applications may be active (e.g., preparing user and/or control data traffic 405 for communication, outputting user and/or control data traffic 405, and/or obtaining user and/or control data traffic 405), the peer entity of the HLOS/AP 410 may communicate information related to the data traffic to the processing system 415. Related information may include examples, such as IP tuples, a quantity of bytes to be communicated, whether the data is foreground data and/or background data, among other examples.

The processing system 415 may select from the traffic flows of the monitored applications, and assign different priorities for those traffic flows (e.g., when real-time traffic is detected). Additionally, or alternatively, the processing system 415 may perform various actions according to a low latency mode. For example, the processing system 415 may disable deep sleep, enable a quick acknowledgement protocol (e.g., RLC quick or fast NACK), and/or extend an RRC connection, among other examples. The processing system 415 may route real-time traffic via separate high-priority queues (e.g., P1 of any of PDCP 1, 2, and/or 3) such that real-time traffic is communicated before the non-real-time traffic (e.g., via uplink). In some aspects, for downlink communications, the processing system 415 may obtain and then output data traffic to applications associated with the higher priority before outputting data traffic to applications associated with a lower priority.

In some aspects, the processing system 415 may route traffic to a single radio bearer 735 or may route different types of traffic to a corresponding radio bearer 735 (e.g., radio bearer 735a, radio bearer 735b, and/or radio bearer 735c). For example, the radio bearer(s) 735 may be examples of a logical channel that is associated with the transportation or transmission of user data and control data between the UE 120 and a network node (e.g., network node 110). Each radio bearer 735 may be associated with a network slice for communicating certain types of traffic. For example, radio bearer 735a may be associated with a "normal" network slice dedicated to the transmission of data traffic having default considerations and/or a default priority in regard to being communicated via radio bearer (e.g., in comparison to larger amounts of data, real-time data, streaming data, among other examples). Radio bearer 735b may be associated with a low latency network slice dedicated to the transmission of data traffic having considerations and/or a different priority for supporting low latency communication of such data traffic (e.g., in comparison to larger amounts of data, "normal" data, streaming data, among other examples). Radio bearer 735c may be associated with a streaming network slice dedicated to the transmission of data traffic having considerations and/or a different priority for supporting video streaming (e.g., in comparison to larger amounts of data, real-time data, "normal" data, among other examples). Other types of traffic that may have corresponding considerations and/or priorities and thus may be communicated via dedicated radio bearer and/or via a dedicated network slice may include URLLC, massive MIMO, cMTC, and/or cMBB, among other examples.

In the example 700, a particular radio bearer 735 may be prioritized such that prioritized traffic may be routed through a particular radio bearer 735 and transmitted via the radio bearer 735 without being queued behind lower priority traffic. For example, lower priority traffic may be routed through a first radio bearer 735 and May not impede transmission of the higher priority traffic (e.g., which may be routed through a second radio bearer 735 having a higher priority than the first radio bearer 735). Radio bearer routing may be using in conjunction with traffic priority identification and queuing performed by the HLOS/AP 410 and/or the processing system 415 as discussed above.

In a first example, gaming data traffic 705a may be associated with a first application of the UE 120 that is, or has been, identified by the processing system 415 as being associated with real-time traffic. The processing system 415 may identify that the first application of the UE is associated with real-time traffic based on a configuration of the UE 120 (e.g., a local configuration of the UE 120 that lists applications generally associated with communicating real-time traffic). The HLOS/AP 410 may monitor the first application for gaming data traffic 705a and/or traffic data statistics of the gaming data traffic 705a (e.g., IP tuples, a quantity of bytes to be communicated, whether the data is foreground data and/or background data, among other examples). The HLOS/AP 410 may output, to the processing system 415, the traffic data statistics associated with the gaming data traffic 705a. The processing system 415 may output an indication to the HLOS/AP 410 that assigns a higher priority to the gaming data traffic 705a. The HLOS/AP 410 may obtain data for the gaming data traffic 705a via an API of the first application and may route the gaming data traffic 705a through the low latency pipeline 740a according to the assigned priority. The processing system 415 may route the gaming data traffic 705a through a first queue P1 of the PDCP2 according to the assigned priority. The PDCP2 may route the gaming data traffic to radio bearer 735b associated with the low latency network slice according to the assigned priority.

Alternatively, the processing system 415 may route the gaming data traffic 705a through a first queue P1 of a single PDCP entity according to the assigned priority. The PDCP entity may route the gaming data traffic to a single radio bearer 735. In such examples, the gaming data traffic 705a may be queued ahead of other traffic obtained by the processing system 415 prior to obtaining the gaming data traffic 405a according to the assigned priority.

In a second example, video chat data traffic 705b may be associated with a second application of the UE 120 that is or has been identified by the processing system 415 as also being associated with real-time traffic. The processing system 415 may identify that the second application of the UE is associated with real-time traffic based on the configuration of the UE 120 (e.g., the local configuration of the UE 120 that lists applications generally associated with communicating real-time traffic). The HLOS/AP 410 may monitor the second application for video chat data traffic 705b and/or traffic data statistics of the video chat data traffic 705b (e.g., IP tuples, a quantity of bytes to be communicated, whether the data is foreground data and/or background data, among other examples). The HLOS/AP 410 may output, to the processing system 415, the traffic data statistics associated with the video chat data traffic 705b. In some aspects, the traffic data statistics associated with the video chat data traffic 705b and the gaming data traffic 705a are output in a single report. The processing system 415 may output an indication to the HLOS/AP 410 that assigns a higher priority to the video chat data traffic 705b. The priority assigned to the gaming data traffic 705a and the video chat data traffic 705b may be the same or different (e.g., even though both gaming data traffic 705a and video chat data traffic 705b may both be considered real-time traffic) based on the configuration. The HLOS/AP 410 may obtain data for the video chat data traffic 705b via an API of the second application and may route the video chat data traffic 705b through the high priority pipeline 740b according to the assigned priority.

The processing system 415 may route the video chat data traffic 705b through a first queue P1 of the PDCP1 according to the assigned priority. The PDCP1 may route the video chat data traffic 705b to radio bearer 735a associated with the "normal" network slice according to the assigned priority. For example, the radio bearer 735a may be associated with "normal" data communications or data flows. However, because the highest priority queue (e.g., P1) associated with the radio bearer 735b for the low latency network slice is queued with the gaming data traffic 705a, and because the radio bearer 735a may not be queued with a data flow at the time the video chat data traffic 705b is being queued, the processing system 415 may determine to route the video chat data traffic 705b into an empty queue despite the radio bearer 735a being associated with lower priority traffic and/or a lower priority network slice.

Alternatively, the processing system 415 may route the video chat data traffic 705b through a first queue P1 of a single PDCP entity according to the assigned priority and/or a second queue P2 of a single PDCP entity according to the assigned priority. For example, the IPA 740 may queue the video chat data traffic 705b ahead of or behind the gaming data traffic 705a depending on the priority assigned to each traffic flow and/or data path 705. The PDCP entity may route the video chat data traffic 705b to a single radio bearer 735 before or after the gaming data traffic 705a. In some aspects, the gaming data traffic 705a may be queued ahead of the video chat data traffic 705b traffic even if the video chat data traffic 705b is obtained first, because gaming data traffic 705a may be more sensitive to delay or lag than video chat data traffic 705b.

In a third example, browser data traffic 705c may be associated with the second application or a third application of the UE 120. For example, browser data traffic 705c may be obtained via a web browser application along with video chat data traffic 705b, or may be obtained via an application that is associated with traffic types other than real-time traffic. The processing system 415 may identify that the second application of the UE is associated with real-time traffic and/or may identify that the third application is not associated with real-time traffic based on the configuration of the UE 120. In a first scenario, the browser data traffic 705c may be associated with the second application and the HLOS/AP 410 may monitor the second application for real-time traffic and/or traffic data statistics of real-time traffic, and may identify that the browser data traffic 705c includes traffic other than real-time traffic. In a second scenario, the browser data traffic 705c may be associated with the third application and the HLOS/AP 410 may refrain from monitoring the third application for real-time traffic because the third application is associated with traffic types other than real-time traffic. In a third scenario, the browser data traffic 705c may be associated with the third application and the HLOS/AP 410 may monitor the third application despite the third application being associated with traffic types other than real-time traffic.

In the first or third scenarios, the HLOS/AP 410 may output, to the processing system 415, the traffic data statistics associated with the browser data traffic 705c. In some aspects, the traffic data statistics associated with the browser data traffic 705c, the video chat data traffic 705b, and/or the gaming data traffic 705a are output in a single report. In the first and third scenarios, the processing system 415 may output an indication to the HLOS/AP 410 that assigns a lower priority to the browser data traffic 705c. The HLOS/AP 410 may obtain data for the browser data traffic 705c via the API of the second application or an API of the third application. In the first and third scenarios, the HLOS/AP 410 may route the browser data traffic 705c through the "normal" priority pipeline 740c according to the assigned priority. In the second scenario, the HLOS/AP 410 may route the browser data traffic 705c through the "normal" priority pipeline 740c based on the third application being associated with traffic types other than real-time traffic or based on the fourth application being unmonitored.

The processing system 415 may route the browser data traffic 705c through a second queue P2 of the PDCP1 according to the assigned priority or according to a lack of assigned priority. The PDCP2 may route the browser data traffic 705c to radio bearer 735a associated with the "normal" network slice according to the assigned priority or a lack of assigned priority. For example, because the highest priority queue (e.g., P1) associated with the radio bearer 735a for the normal slice is queued with the video chat data traffic 705b, the processing system 415 may determine to route the browser data traffic 705c into a lower priority queue. Alternatively, the processing system 415 and/or the IPA 740 may determine to route the browser data traffic 705c into a lower priority queue regardless of whether a higher priority queue includes other traffic.

In some alternative examples, the processing system 415 may route the browser data traffic 705c through a lower priority queue of a single PDCP entity according to the assigned priority or lack thereof. For example, the processing system 415 may queue the browser data traffic 705c behind the video chat data traffic 705b and/or the gaming data traffic 705a depending on the priority assigned to each traffic flow and/or data path 705. The PDCP entity may route the browser data traffic 705c to a single radio bearer 735 after the video chat data traffic 705b and/or gaming data traffic 705a. In some other examples, the browser data traffic 705c may be queued ahead of the gaming data traffic 705a and/or the video chat data traffic 705b, but the gaming data traffic 705a and/or the video chat data traffic 705b may be output or dequeued prior to the browser data traffic 705c because the gaming data traffic 705a and/or the video chat data traffic 705b are assigned with the higher priority.

In a fourth example, video streaming data traffic 705d may be associated with a fourth application of the UE 120. The processing system 415 may identify that the fourth application of the UE is associated with traffic types other than real-time traffic and/or may identify that the fourth application is not associated with real-time traffic based on the configuration of the UE 120. The HLOS/AP 410 may refrain from monitoring the fourth application for real-time traffic because the third application is associated with traffic types other than real-time traffic, and/or the HLOS/AP 410 may monitor the fourth application despite the fourth application being associated with traffic types other than real-time traffic.

In the example where the HLOS/AP 410 monitors the fourth application, the HLOS/AP 410 may output, to the processing system 415, the traffic data statistics associated with the video streaming data traffic 705d. In some aspects, the traffic data statistics associated with the video streaming data traffic 705d, the browser data traffic 705c, the video chat data traffic 705b, and/or the gaming data traffic 705a are output in a single report. In such examples, the processing system 415 may output an indication to the HLOS/AP 410 that assigns a priority (e.g., a lower priority and/or a priority specific to video streaming) to the video streaming data traffic 705d. The HLOS/AP 410 may obtain data for the video streaming data traffic 705d via the API of the fourth application. In some aspects, the HLOS/AP 410 may route the video streaming data traffic 705d through the "normal" priority pipeline 740c according to the assigned priority or lack thereof. In some other examples, the HLOS/AP 410 may route the video streaming data traffic 705d through the "normal" priority pipeline 740c based on the fourth application being associated with traffic types other than real-time traffic or based on the fourth application being unmonitored.

The processing system 415 may route the video streaming data traffic 705d through a lower priority queue Px of the PDCP3 according to the assigned priority or according to a lack of assigned priority. The PDCP3 may route the video streaming data traffic 705d to radio bearer 735c associated with the streaming network slice according to the assigned priority or lack of assigned priority.

In some alternative examples, the processing system 415 may route the video streaming data traffic 705d through a lower priority queue of a single PDCP entity according to the assigned priority or lack thereof. For example, the processing system 415 may queue the video streaming data traffic 705d behind the video chat data traffic 705b and/or the gaming data traffic 705a, and/or ahead of or behind the browser data traffic 705c, depending on the priority assigned to each traffic flow and/or data path 705. The PDCP entity may route the video streaming data traffic 705d to a single radio bearer 735 after the video chat data traffic 705b and/or gaming data traffic 705a, and/or prior to or after the browser data traffic 705c. In some other examples, the video streaming data traffic 705d may be queued ahead of the gaming data traffic 705a, the video chat data traffic 705b, and/or the browser data traffic 705c, but the gaming data traffic 705a and/or the video chat data traffic 705b may be output or dequeued prior to the video streaming data traffic 705d and/or the browser data traffic 705c because the gaming data traffic 705a and/or the video chat data traffic 705b are assigned with the higher priority.

Thus, in each of the above examples, each data path 705 may be queued and/or dequeued according to the processing system 415 determining and/or assigning a priority to each data path 705 (or, for example, refraining from assigning a priority to data paths 705 including traffic types other than high priority traffic types). In some aspects, the processing system may determine and/or assign priority according to the configuration that prioritizes real-time traffic (for example, as described with reference to FIG. 5). In some other examples, the processing system 415 may determine a priority of each traffic flow (or may refrain from assigning a priority to traffic types other than high priority traffic types) according to an ML module of the UE 120 that may identify real-time traffic (for example, as described with reference to FIG. 6).

Although the traffic described herein may be described as data traffic, any of the protocols, procedures or processes described herein may similarly apply to control plane traffic of other types of traffic (e.g., gaming control traffic, video chat control traffic, browser control traffic, and/or video streaming control traffic).

As indicated above, FIG. 7 is provided as an example. Other examples may differ from what is described with respect to FIG. 7.

Figure 8:
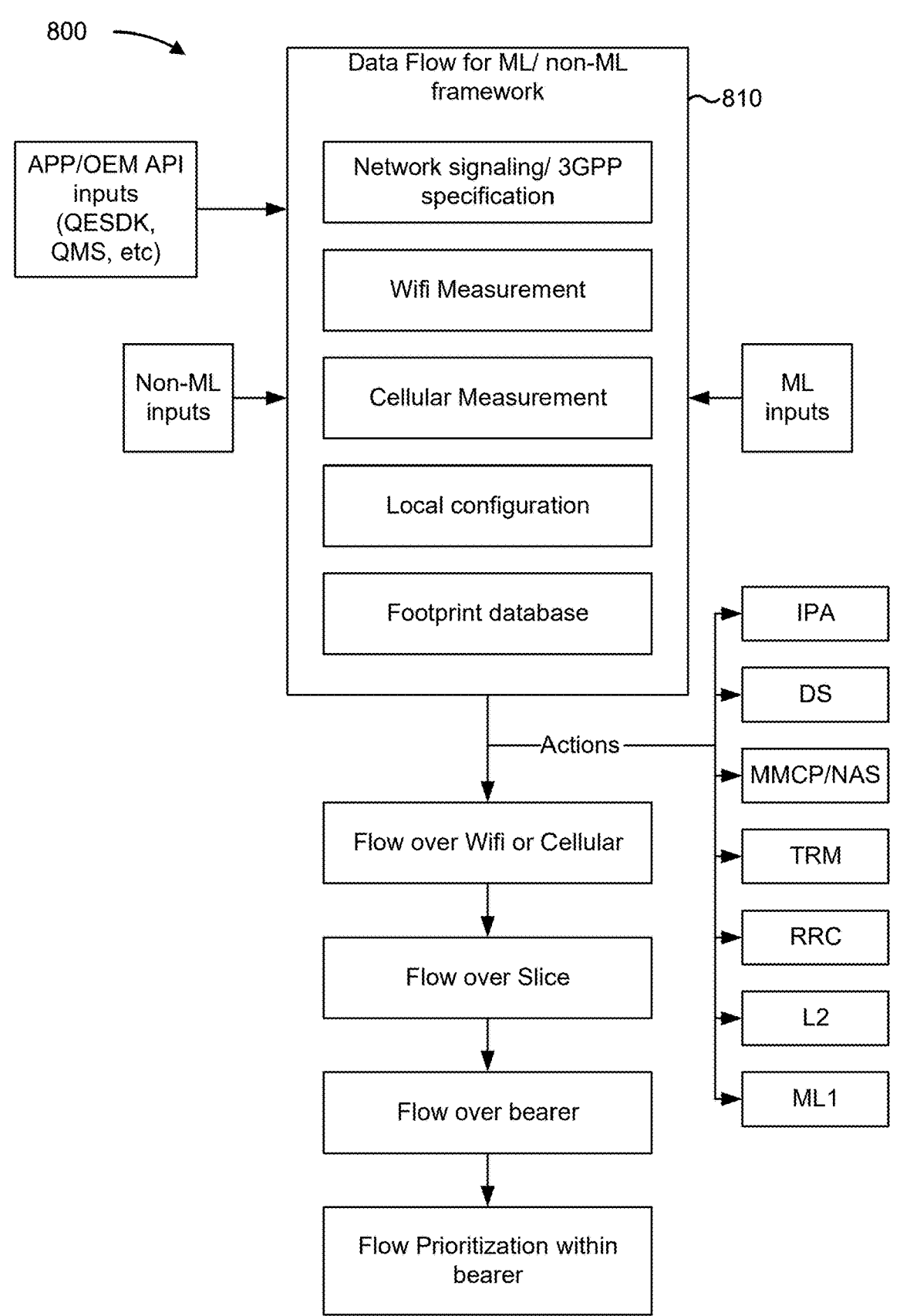
FIG. 8 is a diagram illustrating an example associated with a control path framework in an architecture of a UE, in accordance with the present disclosure.

FIG. 8 is a diagram illustrating an example 800 associated with a control path framework in an architecture of a UE, in accordance with the present disclosure. Example 800 may be implemented at or executed by a UE 120. In some aspects, the UE 120 may be included in a wireless network, such as wireless communication network 100.

The example 800 may include a first module 810 of the UE 120. The first module 810 of the UE 120 may provide the framework for performing one or more actions, processing operations, or procedures according to one or more inputs for internet traffic detecting and prioritizing. The first module 810 of the UE 120 may include or be part of a processing system of the UE 120 (e.g., processing system 415 as described herein and with regard to FIGS. 4 and/or 7). For example, the first module 810 may receive one or more inputs from an application and/or OEM (APP/OEM) API (e.g., a software development kit (SDK), and/or a quality management system (QMS), among other examples), one or more non-ML inputs (e.g., in accordance with the procedure described in FIG. 5, among other examples), and/or ML inputs (e.g., in accordance with the procedure described in FIGS. 7 and 9, among other examples).

The first module 810 may obtain the inputs and may consolidate information from the inputs, or perform one or more actions according to the input information, and/or make one or more determinations according to the input information. The first module 810 may include a quantity of modules, layers, or protocols. For example, the first module 810 may include a first protocol (e.g., protocol, layer, and/or module) that performs one or more actions or decisions according to network signaling and/or the 3GPP; a second protocol that performs Wi-Fi measurements (e.g., performs one or more channel quality measurements of a Wi-Fi-supported communication link); a third protocol that performs cellular measurements (e.g., performs one or more channel quality measurements of a cellular wireless network-supported communication link); a fourth protocol that performs one or more actions or decisions for traffic flow prioritization according to a local configuration (e.g., a local configuration as described with reference to FIG. 5) of the UE 120; and/or a fifth protocol (e.g., a footprint database) that performs one or more actions or decisions for routing one or more traffic flows through Wi-Fi versus a cellular wireless network-supported communication link, among other examples. In some aspects, each protocol may consolidate information for a controller of the modem and may indirectly prompt the UE 120 or the processing system 415 of the UE 120 to perform one or more actions or decisions for traffic prioritization by providing the consolidated information.

Based on receiving the APP/OEM API inputs, the non-ML inputs, and/or the ML inputs, the UE 120, or the processing system 415 of the UE 120, may perform one or more routing actions according to the one or more processes or consolidated information from the first module 810 for real-time traffic prioritization. For example, the UE 120 and/or the processing system 415 of the UE 120 may determine whether to route traffic over Wi-Fi and/or a wireless communication link (e.g., a cellular communication link) according to one or more outputs from the footprint database of the first module 810 and/or the Wi-Fi and/or cellular measurements. Additionally, or alternatively, the UE 120 and/or the processing system 415 may determine to route traffic over one or more slices (e.g., one or more network slice as described with reference to FIGS. 4 and 7) according to the local configuration. Additionally, or alternatively, the UE 120 and/or the processing system 415 may determine to route traffic over one or more radio bearers according to the local configuration for prioritizing real-time traffic. Additionally, or alternatively, the UE 120 and/or the processing system 415 may prioritize one or more traffic flows within each radio bearer according to the local configuration for prioritizing real-time traffic.

Additionally, or alternatively, the UE 120 and/or the processing system 415 of the UE 120 may perform one or more processing actions via one or more protocols (e.g., one or more protocols, layers, and/or modules) such as protocols executed by one or more layer three (L3) protocols and/or modules such as an IPA module, a data services (DS) module, a multi-mode communication protocol (MMCP) and/or a non-access stratum (NAS) (MMCP/NAS) module, a TRM module, an RRC module, one or more layer 2 (L2) protocols and/or modules, and/or MLI protocols and/or modules according to a low latency mode when real-time traffic is detected. For example, each of the IPA module, the DS module, the MMCP/NAS module, the TRM module, the RRC module, the L2 protocols and/or modules, and/or the MLI modules and/or protocols may be configured to enable and/or perform (or, for example, prompt the UE 120 and/or the processing system 415 of the UE 120 to enable and/or perform) actions that may support the communication of traffic according to a low latency mode (e.g., a mode in which low latency communication is a higher priority objective of the UE 120) and/or one or more other modes (e.g., a mode in which low latency communication is a lower priority objective of the UE 120) when real-time traffic is detected. The IPA module may operate as an interconnect between the processing system 415 and an AP of the UE 120 (e.g., HLOS/AP 410, as described herein). The IPA module may cause the processing system 415 of the UE 120, the UE 120, and/or the HLOS/AP 410 to output data packets in a low latency mode shortly after the data packets have been obtained and/or may aggregate data packets before output for the one or more other modes, among other examples.

The DS module may process data and/or data packets in a first manner according to the low latency mode. Alternatively, the DS module may process data and/or data packets in a second manner according to the one or more other modes, which may cause the DS module to process data differently than in the first manner in order to promote low latency communications, among other examples. The MMCP/NAS module may support the mobility of the UE 120 and/or perform session management procedures to establish and maintain IP connectivity between the UE 120 and a PDN GW in a first manner according to the low latency mode and or may support the mobility of the UE 120. Alternatively, the MMCP/NAS module may perform session management procedures to establish and maintain IP connectivity between the UE 120 and the PDN GW in a second manner according to the one or more other modes which may result in a connected session that is different than in the first manner in order to promote low latency communications, among other examples.

The TRM module may manage a transceiver of the UE 120 in a first manner according to the low latency mode. Alternatively, the TRM module may manage the transceiver of the UE 120 in a second manner according to the one or more other modes, which may manage the transceiver differently than in the first manner in order to promote low latency communications, among other examples. The RRC module may prioritize or manage radio bearers in a first manner according to the low latency mode. Alternatively, the RRC module may prioritize or manage radio bearers in a second manner according to the one or more other modes, which may prioritize or manage the radio bearers differently than in the first manner in order to promote low latency communications, among other examples. The L2 module may prioritize traffic flows and/or data packets in a first manner according to the low latency mode and or may prioritize traffic flows and/or data packets in a second manner according to the one or more other modes, which may prioritize traffic differently than in the first manner in order to promote low latency communications, among other examples. The MLI module may cause the UE and/or the processing system 415 to operate in a deep sleep mode for the one or more other modes and may disable the deep sleep mode for low latency operations (e.g., such as when communicating real-time traffic), among other examples.

As indicated above, FIG. 8 is provided as an example. Other examples may differ from what is described with respect to FIG. 8.

Figure 9:
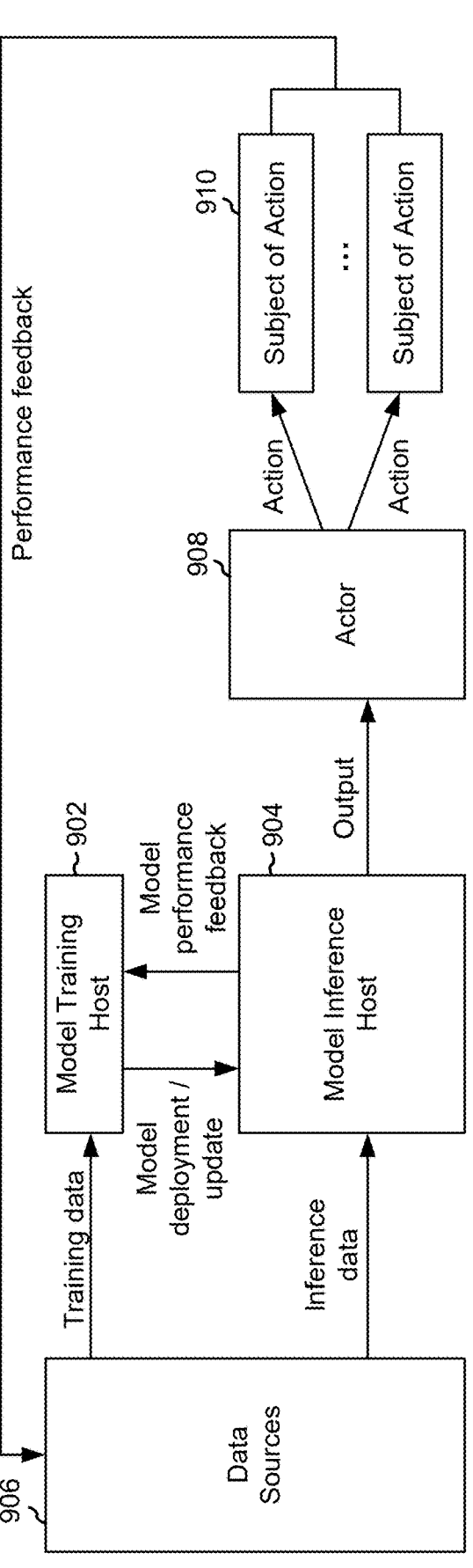
FIG. 9 is a diagram illustrating an example architecture of a functional framework for radio access network (RAN) intelligence enabled by data collection, in accordance with the present disclosure.

FIG. 9 is a diagram illustrating an example architecture 900 of a functional framework for radio access network (RAN) intelligence enabled by data collection, in accordance with the present disclosure. In some scenarios, the functional framework for RAN intelligence may be enabled by further enhancement of data collection through use cases and/or examples. For example, principles or algorithms for RAN intelligence enabled by AI/ML and the associated functional framework (e.g., the AI functionality and/or the input/output of the component for AI enabled optimization) have been utilized or studied to identify the benefits of AI-enabled RAN through possible use cases (e.g., beam management, energy saving, load balancing, mobility management, and/or coverage optimization, among other examples). In one example, as shown by the example architecture 900, a functional framework for RAN intelligence may include multiple logical entities, such as a model training host 902, a model inference host 904, data sources 906, and an actor 908.

The model inference host 904 may be configured to run an AI/ML model based on inference data provided by the data sources 906, and the model inference host 904 may produce an output (e.g., a prediction) with the inference data input to the actor 908. The actor 908 may be an element or an entity of a core network or a RAN. For example, the actor 908 may be a UE, a network node, a base station (e.g., a gNB), a CU, a DU, and/or an RU, among other examples. In addition, the actor 908 may also depend on the type of tasks performed by the model inference host 904, the type of inference data provided to the model inference host 904, and/or the type of output produced by the model inference host 904. For example, if the output from the model inference host 904 is associated with beam management, then the actor 908 may be a UE, a DU, or an RU. In other examples, if the output from the model inference host 904 is associated with Tx/Rx scheduling, then the actor 908 may be a CU or a DU.

In the context of FIGS. 4-8, the model inference host 904 may produce an output including information related to the detection of real-time application traffic. For examples, the model inference host 904 may detect or predict real-time traffic, and/or one or more traffic flows that are associated with real-time traffic. The model inference host 904 may output, to the actor 908, an indication that the one or more traffic flows that are associated with real-time traffic and/or traffic flow information for each detected and/or predicted traffic flow (e.g., such as a traffic type (e.g., "normal," "low-latency," "video," "video chat," "gaming," "streaming," "real-time," and/or "non-real-time," among other examples), a quantity of bytes in the traffic (e.g., for transmission and/or reception), a user-plane application (e.g., executed by the UE) associated with the traffic, and/or whether the traffic is running in background operations of the UE and/or foreground operations of the UE, among other examples). In some aspects, the actor 908 may include a processing system 415 of a UE 120, as described herein with reference to FIGS. 4-7, and/or a UE 120 as described herein with reference to FIGS. 1-3.

After the actor 908 receives an output from the model inference host 904, the actor 908 may determine whether to act based on the output. For example, if the actor 908 is a DU or an RU and the output from the model inference host 904 is associated with beam management, the actor 908 may determine whether to change/modify a Tx/Rx beam based on the output. If the actor 908 determines to act based on the output, the actor 908 may indicate the action to at least one subject of action 910. For example, if the actor 908 determines to change/modify a Tx/Rx beam for a communication between the actor 908 and the subject of action 910 (e.g., a UE 120), then the actor 908 may transmit a beam (re-) configuration or a beam switching indication to the subject of action 910. The actor 908 may modify its Tx/Rx beam based on the beam (re-)configuration, such as switching to a new Tx/Rx beam or applying different parameters for a Tx/Rx beam, among other examples. As another example, the actor 908 may be a UE and the output from the model inference host 904 may be associated with beam management. For example, the output may be one or more predicted measurement values for one or more beams. The actor 908 (e.g., a UE) may determine that a measurement report (e.g., a Layer 1 (L1) RSRP report) is to be transmitted to a network node 110.

In some aspects, after the actor 908 (e.g., including the processing system 415 and/or the UE 120) receives an output including an indication that one or more traffic flows include real-time traffic and/or traffic flow information from the model inference host 904, the actor 908 may determine whether to act based on the output. For example, the processing system 415 may determine to output a traffic flow prioritization indication (e.g., as described herein and shown with regard to reference number 620 of FIG. 6) to an HLOS/AP of the UE (e.g., HLOS/AP 410 of UE 120, as described herein, and with reference to FIGS. 4-7). In some other aspects, the actor 908 may include the UE 120 and the UE may determine to execute a series of one or more instructions for the modem to output the traffic flow prioritization indication. In such examples, the UE may execute a second series of one or more instructions for the HLOS/AP to identify higher priority traffic and queue higher priority traffic before lower priority traffic, as described herein and shown with regard to reference number 640 of FIG. 6. In some aspects, based on determining to prioritize one or more traffic flows in response to receiving the output from the model training host 902 and/or outputting the traffic flow prioritization indication, the UE and/or the modem of the UE may determine to enter a low latency mode. For example, the UE may disable or enable one or more features of the modem and/or the UE to support the communication of real-time traffic in a timely manner. That is, the UE and/or the modem may perform one or more operations that reduce the likelihood that real-time traffic will be hindered by operations or operational settings at the modem and/or the UE.

The data sources 906 may also be configured for collecting data that is used as training data for training an ML model or as inference data for feeding an ML model inference operation. For example, the data sources 906 may collect data from one or more core network and/or RAN entities, which may include the subject of action 910, and provide the collected data to the model training host 902 for ML model training. For example, after a subject of action 910 (e.g., a UE 120) receives a beam configuration from the actor 908, the subject of action 910 may provide performance feedback associated with the beam configuration to the data sources 906, where the performance feedback may be used by the model training host 902 for monitoring or evaluating the ML model performance, such as whether the output (e.g., prediction) provided to the actor 908 is accurate. In some examples, if the output provided by the actor 908 is inaccurate (or the accuracy is below an accuracy threshold), then the model training host 902 may determine to modify or retrain the ML model used by the model inference host, such as via an ML model deployment/update.

Training the model to recognize real-time traffic and/or characteristics of real-time traffic, as described herein, may enable or support the actor 908 to execute prioritization of real-time data such that a latency of real-time traffic is decreased by performing operations to aid in the communication of higher priority data (e.g., including real-time traffic) prior to communicating lower priority data in a more consistent manner (e.g., independently from application-by-application implementation of a prioritization configuration).

As indicated above, FIG. 9 is provided as an example. Other examples may differ from what is described with regard to FIG. 9.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with internet traffic detecting and prioritizing.

As shown in FIG. 10, in some aspects, process 1000 may include identifying, by a first entity of the UE, a first traffic flow of the UE (block 1010). For example, the UE (e.g., using communication manager 1106, depicted in FIG. 11) may identify, by a first entity of the UE, a first traffic flow of the UE, as described above with regard to reference number 525 of FIG. 5 and/or as described in connection with reference numbers 610 and/or 620 of FIG. 6.

As further shown in FIG. 10, in some aspects, process 1000 may include providing, from the first entity and to a second entity of the UE, an indication that the first traffic flow is associated with a first priority (block 1020). For example, the UE (e.g., using communication manager 1106, depicted in FIG. 11) may provide, from the first entity and to a second entity of the UE, an indication that the first traffic flow is associated with a first priority, as described above with regard to reference number 530 of FIG. 5 and/or reference number 620 of FIG. 6.

As further shown in FIG. 10, in some aspects, process 1000 may include obtaining, from the second entity, a first data packet associated with the first traffic flow, wherein the first data packet is queued in a first queue (block 1030). For example, the UE (e.g., using reception component 1102 and/or communication manager 1106, depicted in FIG. 11) may obtain, from the second entity, a first data packet associated with the first traffic flow, wherein the first data packet is queued in a first queue, as described above with regard to reference numbers 545 and/or 555 of FIG. 5 and/or reference numbers 650 and/or 670 of FIG. 6.

As further shown in FIG. 10, in some aspects, process 1000 may include obtaining, from the second entity, a second data packet associated with a second traffic flow that is associated with a second priority, wherein the second data packet is queued in a second queue, the first priority being a higher priority than the second priority (block 1040). For example, the UE (e.g., using reception component 1102 and/or communication manager 1106, depicted in FIG. 11)

may obtain, from the second entity, a second data packet associated with a second traffic flow that is associated with a second priority, wherein the second data packet is queued in a second queue, the first priority being a higher priority than the second priority, as described above with regard to reference numbers 550 and/or 560 of FIG. 5 and/or reference numbers 660 and/or 680 of FIG. 6.

As further shown in FIG. 10, in some aspects, process 1000 may include transmitting, to a network node, the first data packet prior to transmitting the second data packet in association with the first data packet being queued in the first queue (block 1050). For example, the UE (e.g., using transmission component 1104 and/or communication manager 1106, depicted in FIG. 11) may transmit, to a network node, the first data packet prior to transmitting the second data packet in association with the first data packet being queued in the first queue, as described above with regard to reference number 565 of FIG. 5 and/or reference number 690 of FIG. 6.

Process 1000 may include additional aspects, such as any single aspect or any combination of aspects described below and/or in connection with one or more other processes described elsewhere herein.

In a first aspect, the first data packet and the second data packet are associated with a same application configured to execute on the UE.

In a second aspect, the first data packet and the second data packet are associated with different applications, each stored by the UE.

In a third aspect, alone or in combination with one or more of the first and second aspects, the first traffic flow comprises real-time traffic or low latency traffic, and the second traffic flow comprises normal latency traffic.

In a fourth aspect, alone or in combination with one or more of the first through third aspects, process 1000 includes identifying, from a list of applications indicated by a configuration, a set of one or more applications stored by the UE, wherein each application of the set of one or more applications is configured with a traffic type, the traffic type being associated with the first priority, and providing, to the second entity according to the configuration, a report request that requests traffic flow information, from the second entity, for each application of the set of one or more applications.

In a fifth aspect, alone or in combination with one or more of the first through fourth aspects, process 1000 includes receiving, in association with the report request, a traffic flow report comprising the traffic flow information.

In a sixth aspect, alone or in combination with one or more of the first through fifth aspects, identifying the first traffic flow associated with the traffic type comprises identifying one or more traffic flows to associate with the first priority according to the traffic flow report, and providing the indication of the first traffic flow comprises providing, to the second entity, an indication of the one or more traffic flows to associate with the first priority, wherein the one or more traffic flows include the first traffic flow.

In a seventh aspect, alone or in combination with one or more of the first through sixth aspects, the traffic flow information for each application comprises at least one of an indication of an associated application, a quantity of uplink data traffic units, a quantity of downlink data traffic units, or a corresponding traffic type.

In an eighth aspect, alone or in combination with one or more of the first through seventh aspects, process 1000 includes monitoring, by the second entity, for the traffic flow information in association with the report request provided by the first entity, and providing, to the first entity, a traffic flow report comprising the traffic flow information.

In a ninth aspect, alone or in combination with one or more of the first through eighth aspects, the report request comprises a report periodicity.

In a tenth aspect, alone or in combination with one or more of the first through ninth aspects, the traffic type comprises real-time communications traffic.

In an eleventh aspect, alone or in combination with one or more of the first through tenth aspects, process 1000 includes obtaining, by the first entity and from a machine learning module of the UE, a first indication of one or more traffic flows and one or more corresponding traffic types, wherein identifying the first traffic flow is associated with obtaining the first indication of the one or more traffic flows and the one or more corresponding traffic types, and wherein providing the indication that the first traffic flow is associated with the first priority comprises providing, to the second entity of the UE, a second indication that the one or more traffic flows are associated with the first priority, wherein the one or more traffic flows include the first traffic flow.

In a twelfth aspect, alone or in combination with one or more of the first through eleventh aspects, process 1000 includes enabling a low latency mode of the UE in association with providing the indication of the first traffic flow.

In a thirteenth aspect, alone or in combination with one or more of the first through twelfth aspects, entering the low latency mode comprises disabling a deep sleep mode of the UE.

In a fourteenth aspect, alone or in combination with one or more of the first through thirteenth aspects, entering the low latency mode comprises performing a radio resource control connection extension.

In a fifteenth aspect, alone or in combination with one or more of the first through fourteenth aspects, entering the low latency mode comprises enabling radio link control fast negative acknowledgement.

In a sixteenth aspect, alone or in combination with one or more of the first through fifteenth aspects, obtaining the first data packet comprises obtaining the first data packet via a first data packet pipeline, and obtaining the second data packet comprises obtaining the second data packet via a second data packet pipeline.

In a seventeenth aspect, alone or in combination with one or more of the first through sixteenth aspects, the first data packet pipeline comprises a low latency pipeline or a high priority pipeline, and the second data packet pipeline comprises a normal traffic pipeline.

In an eighteenth aspect, alone or in combination with one or more of the first through seventeenth aspects, the first data packet pipeline comprises a high-speed pipeline and the second data packet pipeline comprises a low-speed pipeline.

In a nineteenth aspect, alone or in combination with one or more of the first through eighteenth aspects, transmitting the first data packet comprises dequeuing the first data packet prior to dequeuing the second data packet.

In a twentieth aspect, alone or in combination with one or more of the first through nineteenth aspects, the first entity is a processing system and the second entity is a high-level operating system.

In a twenty-first aspect, alone or in combination with one or more of the first through twentieth aspects, the first queue and the second queue are a same queue, and the first data packet is queued ahead of the second data packet in the same queue in association with the first priority being the higher priority than the second priority.

In a twenty-second aspect, alone or in combination with one or more of the first through twentieth aspects, the first queue is associated with a first radio bearer and the second queue is associated with a second radio bearer.

In a twenty-third aspect, alone or in combination with one or more of the first through twenty-second aspects, process 1000 includes receiving, from the network node, a third data packet and a fourth data packet, identifying, by the first entity of the UE, that a third traffic flow associated with the third data packet is associated with a traffic type and the first priority, and providing, to the second entity, the third data packet prior to providing the fourth data packet in association with the third traffic flow being associated with the first priority.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
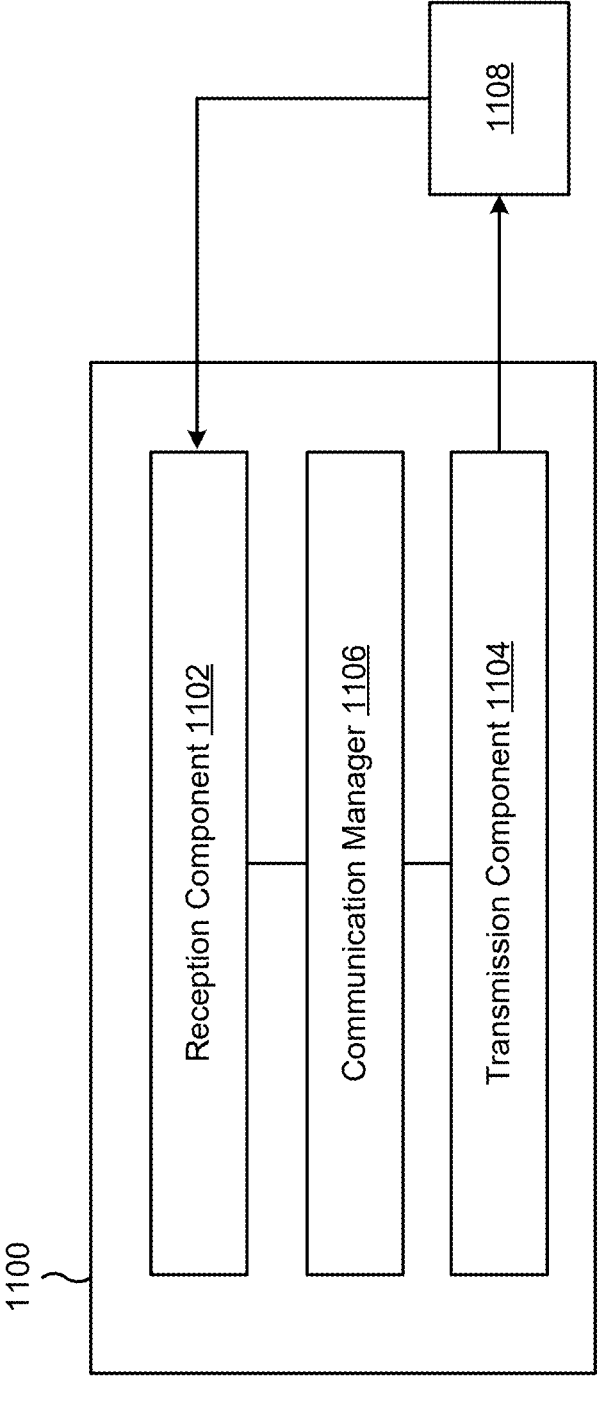
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described in connection with FIG. 1 and FIG. 2. Additionally, or alternatively, one or more components shown in FIG. 11 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 1 and FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 1 and FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may identify, by a first entity of the UE, a first traffic flow of the UE. The communication manager 1106 may provide, from the first entity and to a second entity of the UE, an indication that the first traffic flow is associated with a first priority. The reception component 1102 may obtain, from the second entity, a first data packet associated with the first traffic flow, wherein the first data packet is queued in a first queue. The reception component 1102 may obtain, from the second entity, a second data packet associated with a second traffic flow that is associated with a second priority, wherein the second data packet is queued in a second queue, the first priority being a higher priority than the second priority. The transmission component 1104 may transmit, to a network node, the first data packet prior to transmitting the second data packet in association with the first data packet being queued in the first queue.

The communication manager 1106 may identify, from a list of applications indicated by a configuration, a set of one or more applications stored by the UE, wherein each application of the set of one or more applications is configured with a traffic type, the traffic type being associated with the first priority.

The communication manager 1106 may provide, to the second entity according to the configuration, a report request that requests traffic flow information, from the second entity, for each application of the set of one or more applications.

The reception component 1102 may receive, in association with the report request, a traffic flow report comprising the traffic flow information.

The communication manager 1106 may monitor for the traffic flow information in association with the report request provided by the first entity.

The communication manager 1106 may provide, to the first entity, a traffic flow report comprising the traffic flow information.

The reception component 1102 may obtain, from a machine learning module of the UE, a first indication of one or more traffic flows and one or more corresponding traffic types, wherein identifying the first traffic flow is associated with obtaining the first indication of the one or more traffic flows and the one or more corresponding traffic types, and providing the indication that the first traffic flow is associated with the first priority comprises providing, to the second entity of the UE, a second indication that the one or more traffic flows are associated with the first priority, wherein the one or more traffic flows include the first traffic flow.

The communication manager 1106 may enable a low latency mode of the UE in association with providing the indication of the first traffic flow.

The reception component 1102 may receive, from the network node, a third data packet and a fourth data packet. The communication manager 1106 may identify that a third traffic flow associated with the third data packet is associated with a traffic type and the first priority. The communication manager 1106 may provide, to the second entity, the third data packet prior to providing the fourth data packet in association with the third traffic flow being associated with the first priority.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: identifying, by a first entity of the UE, a first traffic flow of the UE; providing, from the first entity and to a second entity of the UE, an indication that the first traffic flow is associated with a first priority; obtaining, by the first entity and from the second entity, a first data packet associated with the first traffic flow, wherein the first data packet is queued in a first queue; obtaining, by the first entity and from the second entity, a second data packet associated with a second traffic flow that is associated with a second priority, wherein the second data packet is queued in a second queue, the first priority being a higher priority than the second priority; and transmitting, to a network node, the first data packet prior to transmitting the second data packet in association with the first data packet being queued in the first queue.

Aspect 2: The method of Aspect 1, wherein the first data packet and the second data packet are associated with a same application configured to execute on the UE.

Aspect 3: The method of Aspect 1, wherein the first data packet and the second data packet are associated with different applications, each stored by the UE.

Aspect 4: The method of any of Aspects 1-3, wherein the first traffic flow comprises real-time traffic or low latency traffic, and the second traffic flow comprises normal latency traffic.

Aspect 5: The method of any of Aspects 1-4, further comprising: identifying, from a list of applications indicated by a configuration, a set of one or more applications stored by the UE, wherein each application of the set of one or more applications is configured with a traffic type, the traffic type being associated with the first priority; and providing, to the second entity according to the configuration, a report request that requests traffic flow information, from the second entity, for each application of the set of one or more applications.

Aspect 6: The method of Aspect 5, further comprising: receiving, in association with the report request, a traffic flow report comprising the traffic flow information.

Aspect 7: The method of Aspect 6, wherein identifying the first traffic flow associated with the traffic type comprises: identifying one or more traffic flows to associate with the first priority according to the traffic flow report, and wherein providing the indication of the first traffic flow comprises: providing, to the second entity, an indication of the one or more traffic flows to associate with the first priority, wherein the one or more traffic flows include the first traffic flow.

Aspect 8: The method of any of Aspects 6 and 7, wherein the traffic flow information for each application comprises at least one of: an indication of an associated application, a quantity of uplink data traffic units, a quantity of downlink data traffic units, or a corresponding traffic type.

Aspect 9: The method of any of Aspects 5-8, further comprising: monitoring, by the second entity, for the traffic flow information in association with the report request provided by the first entity; and providing, to the first entity, a traffic flow report comprising the traffic flow information.

Aspect 10: The method of any of Aspects 5-9, wherein the report request comprises a report periodicity.

Aspect 11: The method of any of Aspects 5-10, wherein the traffic type comprises real-time communications traffic.

Aspect 12: The method of any of Aspects 1-4, further comprising: obtaining, by the first entity and from a machine learning module of the UE, a first indication of one or more traffic flows and one or more corresponding traffic types, wherein identifying the first traffic flow is associated with obtaining the first indication of the one or more traffic flows and the one or more corresponding traffic types, and wherein providing the indication that the first traffic flow is associated with the first priority comprises: providing, to the second entity of the UE, a second indication that the one or more traffic flows are associated with the first priority, wherein the one or more traffic flows include the first traffic flow.

Aspect 13: The method of any of Aspects 1-12, further comprising: enabling a low latency mode of the UE in association with providing the indication of the first traffic flow.

Aspect 14: The method of Aspect 13, wherein entering the low latency mode comprises: disabling a deep sleep mode of the UE.

Aspect 15: The method of any of Aspects 13 and 14, wherein entering the low latency mode comprises: performing a radio resource control connection extension.

Aspect 16: The method of Aspect any of Aspects 13-15, wherein entering the low latency mode comprises: enabling radio link control fast negative acknowledgement.

Aspect 17: The method of any of Aspects 1-16, wherein obtaining the first data packet comprises: obtaining the first data packet via a first data packet pipeline, and wherein obtaining the second data packet comprises: obtaining the second data packet via a second data packet pipeline.

Aspect 18: The method of Aspect 17, wherein the first data packet pipeline comprises a low latency pipeline or a high priority pipeline, and the second data packet pipeline comprises a normal traffic pipeline.

Aspect 19: The method of and of Aspects 17 and 18, wherein the first data packet pipeline comprises a high-speed pipeline and the second data packet pipeline comprises a low-speed pipeline.

Aspect 20: The method of any of Aspects 1-19, wherein transmitting the first data packet comprises: dequeuing the first data packet prior to dequeuing the second data packet.

Aspect 21: The method of any of Aspects 1-20, wherein the first entity is a processing system and the second entity is a high-level operating system.

Aspect 22: The method of any of Aspects 1-21, wherein the first queue and the second queue are a same queue, and the first data packet is queued ahead of the second data packet in the same queue in association with the first priority being the higher priority than the second priority.

Aspect 23: The method of any of Aspects 1-21, wherein the first queue is associated with a first radio bearer and the second queue is associated with a second radio bearer.

Aspect 24: The method of any of Aspects 1-23, further comprising: receiving, from the network node, a third data packet and a fourth data packet; identifying, by the first entity of the UE, that a third traffic flow associated with the third data packet is associated with a traffic type and the first priority; and providing, to the second entity, the third data packet prior to providing the fourth data packet in association with the third traffic flow being associated with the first priority.

Aspect 25: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-24.

Aspect 26: An apparatus for wireless communication at a device, the apparatus comprising one or more memories and one or more processors coupled to the one or more memories, the one or more processors configured to cause the device to perform the method of one or more of Aspects 1-24.

Aspect 27: An apparatus for wireless communication, the apparatus comprising at least one means for performing the method of one or more of Aspects 1-24.

Aspect 28: A non-transitory computer-readable medium storing code for wireless communication, the code comprising instructions executable by one or more processors to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

Aspect 30: A device for wireless communication, the device comprising a processing system that includes one or more processors and one or more memories coupled with the one or more processors, the processing system configured to cause the device to perform the method of one or more of Aspects 1-24.

Aspect 31: An apparatus for wireless communication at a device, the apparatus comprising one or more memories and one or more processors coupled to the one or more memories, the one or more processors individually or collectively configured to cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:
   one or more memories; and
   one or more processors, coupled to the one or more memories, configured to cause the UE to:
      identify, from a list of applications indicated by a configuration, a set of one or more applications stored by the UE, wherein each application of the set of one or more applications is configured with a traffic type;
      provide, to a second entity of the UE according to the configuration, a report request that requests traffic flow information for each application of the set of one or more applications;
      receive, from the second entity in association with the report request, a traffic flow report comprising the traffic flow information for each application of the set of one or more applications;
      identify, by a first entity of the UE, a first traffic flow of the UE;
      provide, from the first entity and to the second entity, an indication that the first traffic flow is associated with a first priority in accordance with the traffic flow report;
      obtain, from the second entity, a first data packet associated with the first traffic flow, wherein the first data packet is queued in a first queue;
      obtain, from the second entity, a second data packet associated with a second traffic flow that is associated with a second priority in accordance with the traffic flow report in accordance with the traffic flow report, wherein the second data packet is queued in a second queue, the first priority being a higher priority than the second priority; and
      transmit, to a network node, the first data packet prior to transmitting the second data packet in association with the first data packet being queued in the first queue.

2. The apparatus of claim 1, wherein the first traffic flow comprises real-time traffic or low latency traffic, and the second traffic flow comprises normal latency traffic.

3. The apparatus of claim 1, wherein the one or more processors, to cause the UE to identify the first traffic flow associated with the traffic type, are configured to cause the UE to:

identify one or more traffic flows to associate with the first priority according to the traffic flow report, and wherein providing the indication of the first traffic flow comprises:

provide, to the second entity, an indication of the one or more traffic flows to associate with the first priority, wherein the one or more traffic flows include the first traffic flow.

4. The apparatus of claim 1, wherein the traffic flow information for each application comprises at least one of:

an indication of an associated application, a quantity of uplink data traffic units, a quantity of downlink data traffic units, or a corresponding traffic type.

5. The apparatus of claim 1, wherein the one or more processors are further configured to cause the UE to:

monitor for the traffic flow information in association with the report request provided by the first entity; and provide, to the first entity, a traffic flow report comprising the traffic flow information.

6. The apparatus of claim 1, wherein the report request comprises a report periodicity.

7. The apparatus of claim 1, wherein the one or more processors are further configured to cause the UE to:

obtain, from a machine learning module of the UE, a first indication of one or more traffic flows and one or more corresponding traffic types, wherein identifying the first traffic flow is associated with obtaining the first indication of the one or more traffic flows and the one or more corresponding traffic types, and wherein the one or more processors, to cause the UE to provide the indication that the first traffic flow is associated with the first priority, are configured to cause the UE to:

provide, to the second entity of the UE, a second indication that the one or more traffic flows are associated with the first priority, wherein the one or more traffic flows include the first traffic flow.

8. The apparatus of claim 1, wherein the one or more processors are further configured to cause the UE to:

enable a low latency mode of the UE in association with providing the indication of the first traffic flow.

9. The apparatus of claim 1, wherein the one or more processors, to cause the UE to obtain the first data packet, are configured to cause the UE to:

obtain the first data packet via a first data packet pipeline, and wherein obtaining the second data packet comprises:

obtain the second data packet via a second data packet pipeline.

10. The apparatus of claim 9, wherein the first data packet pipeline comprises a low latency pipeline or a high priority pipeline, and the second data packet pipeline comprises a normal traffic pipeline.

11. The apparatus of claim 9, wherein the first data packet pipeline comprises a high-speed pipeline and the second data packet pipeline comprises a low-speed pipeline.

12. The apparatus of claim 1, wherein the one or more processors, to cause the UE to transmit the first data packet, are configured to cause the UE to:

dequeue the first data packet prior to dequeuing the second data packet.

13. The apparatus of claim 1, wherein the first entity is a processing system and the second entity is a high-level operating system.

14. The apparatus of claim 1, wherein the first queue and the second queue are a same queue, and the first data packet is queued ahead of the second data packet in the same queue in association with the first priority being the higher priority than the second priority.

15. The apparatus of claim 1, wherein the first queue is associated with a first radio bearer and the second queue is associated with a second radio bearer.

16. The apparatus of claim 1, wherein the one or more processors are further configured to cause the UE to:

receive, from the network node, a third data packet and a fourth data packet;

identify that a third traffic flow associated with the third data packet is associated with a traffic type and the first priority; and provide, to the second entity, the third data packet prior to providing the fourth data packet in association with the third traffic flow being associated with the first priority.

17. A method of wireless communication performed by a user equipment (UE), comprising:

identifying, from a list of applications indicated by a configuration, a set of one or more applications stored by the UE, wherein each application of the set of one or more applications is configured with a traffic type;

providing, to a second entity of the UE according to the configuration, a report request that requests traffic flow information for each application of the set of one or more applications;

receiving, from the second entity in association with the report request, a traffic flow report comprising the traffic flow information for each application of the set of one or more applications;

identifying, by a first entity of the UE, a first traffic flow of the UE;

providing, from the first entity and to the second entity, an indication that the first traffic flow is associated with a first priority in accordance with the traffic flow report;

obtaining, by the first entity and from the second entity, a first data packet associated with the first traffic flow, wherein the first data packet is queued in a first queue;

obtaining, by the first entity and from the second entity, a second data packet associated with a second traffic flow that is associated with a second priority in accordance with the traffic flow report, wherein the second data packet is queued in a second queue, the first priority being a higher priority than the second priority; and transmitting, to a network node, the first data packet prior to transmitting the second data packet in association with the first data packet being queued in the first queue.

18. A non-transitory computer-readable medium storing a set of instructions for wireless communication, the set of instructions comprising:

one or more instructions that, when executed by one or more processors of a user equipment (UE), cause the UE to:

identify, from a list of applications indicated by a configuration, a set of one or more applications stored by the UE, wherein each application of the set of one or more applications is configured with a traffic type;

provide, to a second entity of the UE according to the configuration, a report request that requests traffic flow information for each application of the set of one or more applications;

receive, from the second entity in association with the report request, a traffic flow report comprising the traffic flow information for each application of the set of one or more applications;

identify, by a first entity of the UE, a first traffic flow of the UE;

provide, from the first entity and to the second entity, an indication that the first traffic flow is associated with a first priority in accordance with the traffic flow report;

obtain, from the second entity, a first data packet associated with the first traffic flow, wherein the first data packet is queued in a first queue;

obtain, from the second entity, a second data packet associated with a second traffic flow that is associated with a second priority in accordance with the traffic flow report, wherein the second data packet is queued in a second queue, the first priority being a higher priority than the second priority; and transmit, to a network node, the first data packet prior to transmitting the second data packet in association with the first data packet being queued in the first queue.

19. The method of claim 17, wherein the traffic flow information for each application comprises at least one of:

an indication of an associated application, a quantity of uplink data traffic units, a quantity of downlink data traffic units, or a corresponding traffic type.

20. The method of claim 17, further comprising:

monitoring for the traffic flow information in association with the report request provided by the first entity; and providing, to the first entity, a traffic flow report comprising the traffic flow information.

* * * * *